United States Patent
Sasagawa et al.

(10) Patent No.: US 7,860,031 B2
(45) Date of Patent: Dec. 28, 2010

(54) APPARATUS AND METHOD FOR PROCESSING CONTROL PACKET IN SPANNING TREE PROTOCOL

(75) Inventors: Yasushi Sasagawa, Kawasaki (JP); Masami Doukai, Kawasaki (JP); Kou Takatori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1447 days.

(21) Appl. No.: 10/813,792

(22) Filed: Mar. 30, 2004

(65) Prior Publication Data

US 2004/0179524 A1  Sep. 16, 2004

(30) Foreign Application Priority Data

Oct. 29, 2003  (JP)  ............................. 2003-368672
Dec. 25, 2003  (JP)  ............................. 2003-431154

(51) Int. Cl.
  *H04L 12/28*  (2006.01)
(52) U.S. Cl. ..................................... 370/256
(58) Field of Classification Search ........................ None
See application file for complete search history.

(56) References Cited

U.S. PATENT DOCUMENTS 6,298,061 B1 * 10/2001 Chin et al. .................. 370/400
6,535,480 B1 *  3/2003 Bhagavath et al. .......... 370/225
6,577,600 B1 *  6/2003 Bare .......................... 370/238
6,581,166 B1 *  6/2003 Hirst et al. ..................... 714/4

FOREIGN PATENT DOCUMENTS

JP  11-205368  7/1999

* cited by examiner

*Primary Examiner*—Raj K Jain
(74) *Attorney, Agent, or Firm*—Katten Muchin Rosenman LLP

(57) ABSTRACT

When a control packet is transmitted/received among devices that support a spanning tree protocol (STP), a receiving side device temporarily stores a received control packet in a buffer. When the transmission of a control packet from a transmitting side device is stopped, the control packet stored in the buffer is transferred to a STP processing unit in a specific cycle. Alternatively, the transmitting side device autonomously transmits a control packet for a specific period at specific intervals from when the STP processing unit stops its operation until it restarts the operation according to an instruction to start an automatic transmission.

12 Claims, 15 Drawing Sheets

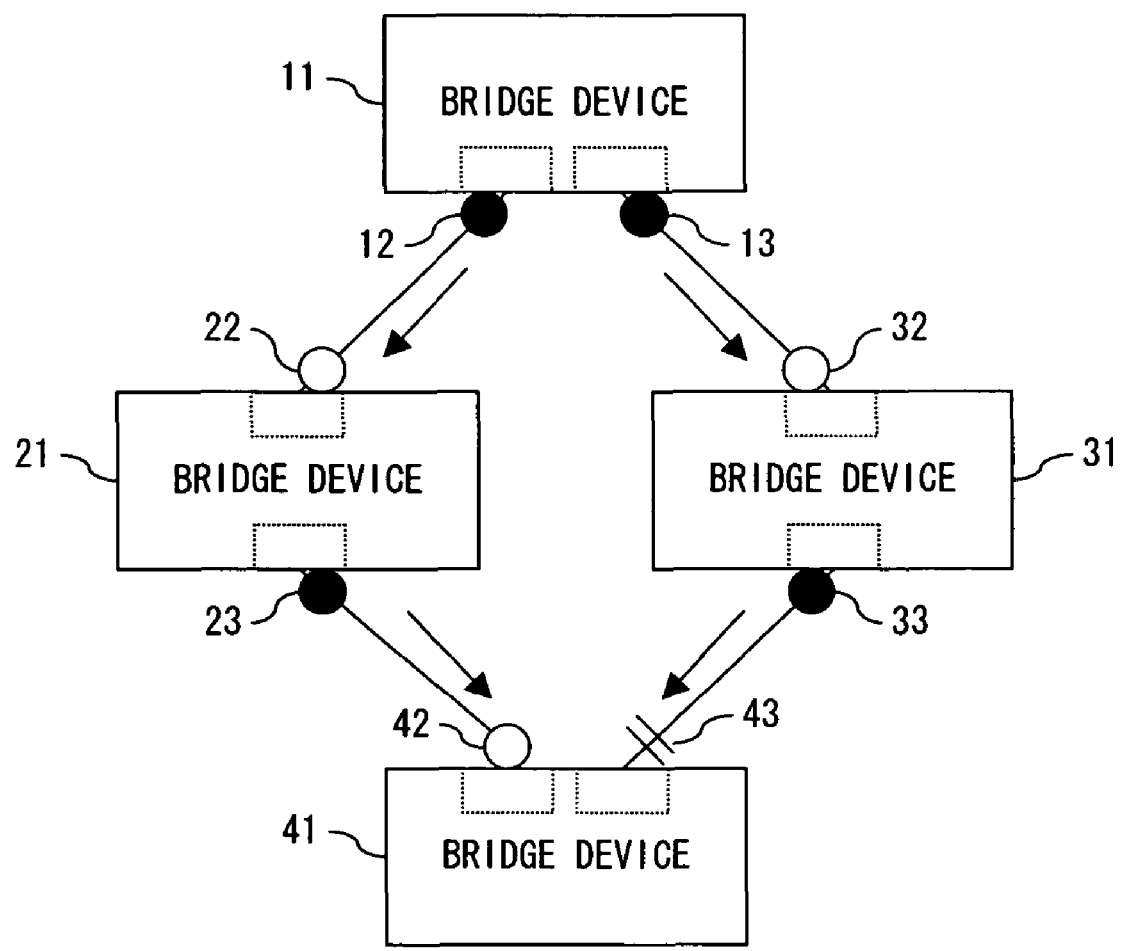
F I G. 1 A

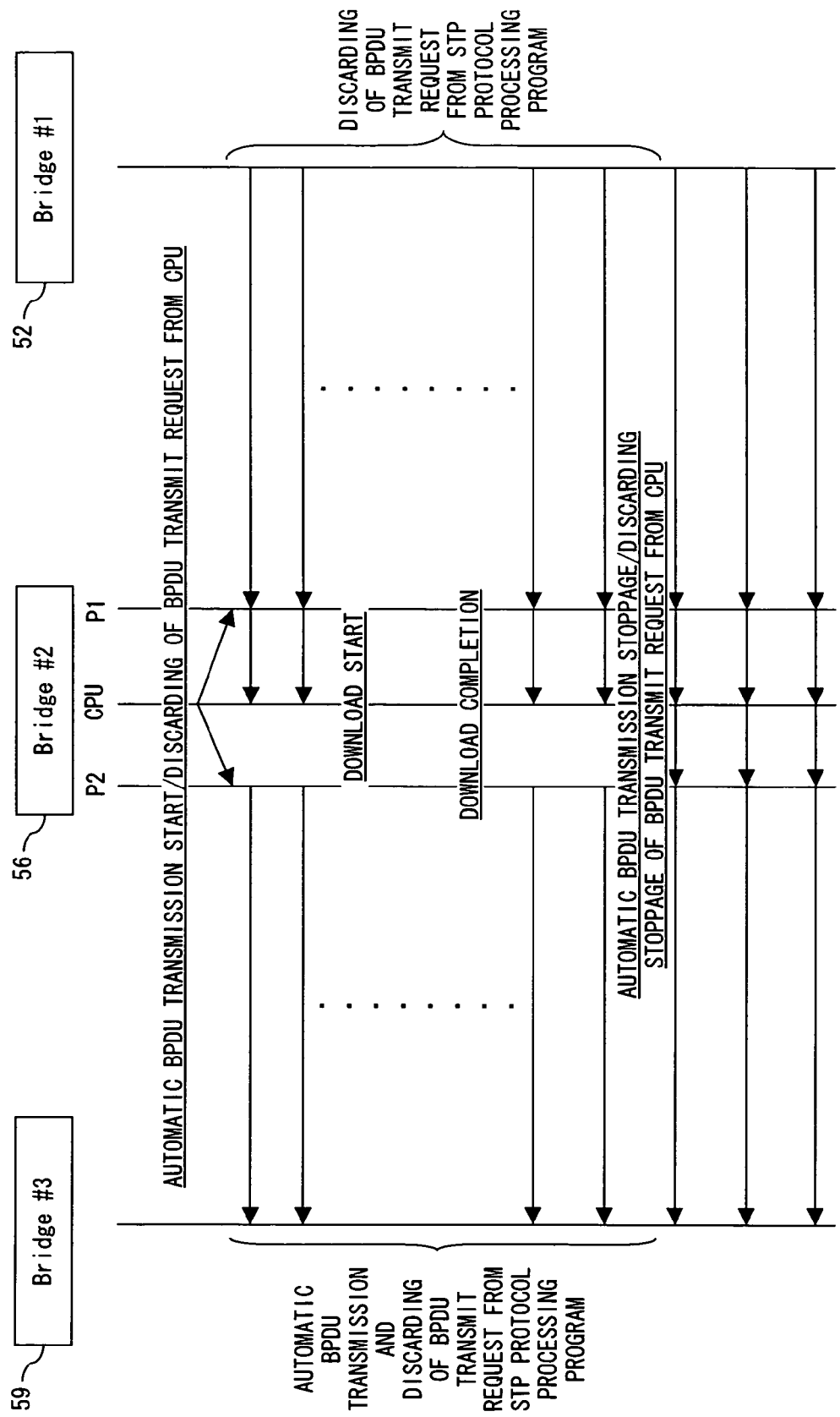

APPARATUS AND METHOD FOR PROCESSING CONTROL PACKET IN SPANNING TREE PROTOCOL

BACKGROUND OF THE INVENTION

1. Field of the Invention

The present invention relates to an apparatus and a method for processing control packets transmitted/received between devices that support a spanning tree protocol (STP).

2. Description of the Related Art

A spanning tree protocol is specified in IEEE (Institute of Electrical and Electronic Engineers) 802.1D (media access control (MAC) bridge and is for producing a single spanning tree (loop-free tree) from an arbitrary bridged LAN topology. The function of an STP is extended by IEEE802.1s (Multiple Spanning Trees) and IEEE802.1w (rapid spanning tree protocol, RSTP) and is widely used in bridge networks.

A bridge network, which is a communication network comprising a plurality of bridge devices, was mainly used in local area networks (LAN) at the beginning. However, recently, its area in use has been extended to a carrier network, as called "Wide area Ethernet (registered trademark)".

Therefore, in order to reduce the number of interruptions of the frame transfer service of network devices operated by an STP, the improvement of its reliability/serviceability is required. An STP is not only limited to pure bridge devices, but also sometimes installed in a variety of network devices, such as a router and the like.

An STP is a communication protocol for determining a bridge device that becomes a root in a bridge network, establishing a communication route in a tree shape from the bridge device and prohibiting data from being transferred on a link other than the tree. Since a route is uniquely determined between arbitrary bridge devices thus, the generation of a loop can be prevented.

The bridge device receives an Ethernet (registered trademark) frame, determines an appropriate destination port on the basis of the destination MAC address of the frame, and transfers the received frame. In order to determine a root bridge device and a communication route, a control packet called a "bridge protocol data unit (BPDU)" is transmitted/received between adjacent bridge devices.

When determining a communication route, a BPDU that stores the cost value of each communication route is sequentially transmitted from the root bridge device to a link destination bridge device. Then, a bridge device that has received BPDUs from a plurality of bridge devices compares the respective cost values of these BPDUs and designates a port that has received a BPDU with the minimum cost value as a communication port. In this case, the other ports are blocked to prevent a loop from being generated, and are designated as alternate ports to be used at the time of failure.

Generally, a BPDU is defined as a control frame used to exchange a variety of information among bridge devices. If a topology is stable in a normal state, this BPDU is periodically and regularly transmitted from the designated port in order to monitor link failures. Specifically, the transmitting interval of the BPDU is called a "hello time", and its default value is set to two seconds.

FIG. 1A shows an example of BPDU transmission/reception in such a normal state. The network shown in FIG. 1A comprises bridge devices 11, 21, 31 and 41, of which the bridge device 11 is assigned to a root bridge device. In this case, the port 43 of the bridge device 41 opposing the designated port 33 of the bridge device 31 is blocked as an alternate port.

A BPDU is sequentially transferred from the designated ports 12 and 13 of the bridge device 11 to another adjacent bridge device in the directions of the arrows. A BPDU transmitted from the designated port 12 is received by the root port 22 of the bridge device 21, and a BPDU transmitted from the designated device 13 is received by the root port 32 of the bridge device 31. A BPDU transmitted from the designated port 23 of the bridge device 21 is received by the root port 42 of the bridge device 41.

FIG. 1B shows a configuration of the active topology of a bridge network by an STP. FIG. 1C is a sequence chart showing BPDU transmission/reception in the normal state of the active topology shown in FIG. 1B.

The network shown in FIG. 1B comprises terminals 51 and 63, and bridge devices 52 (Bridge #1), 56 (Bridge #2) and 59 (Bridge #3). The bridge device 52 is assigned to a root bridge device. The terminals 51 and 63 are connected to the port 53 (P1) of the bridge device 52 and the port 60 (P1) of the bridge device 59, respectively. In this case, the port 61 (P2) of the bridge device 59 opposing the designated port 55 (P3) of the bridge device 52 is blocked as an alternate port.

A BPDU is transferred from the designated ports 54 (P2) and 55 (P3) of the bridge device 52 to the root port 57 (P1) of the bridge device 56 and the port 61 (P2) of the bridge device 59. Furthermore, the BPDU is further transferred from the designated port 58 (P2) of the bridge device 56 to the toot port 62 (P3) of the bridge device 59.

In order to shorten a time needed to transmit a BPDU, a configuration in which the transmitting process is autonomously performed by hardware is also proposed (see, for example, Japanese Patent Application Laid-open No. 11-205368).

If in a port such as a root port receiving BPDUs and the like, a state where no BPDU is received for a specific time is detected, the bridge device recognizes that there is a failure in the opposing designated port or the designated port is disconnected, and starts to newly re-configure a topology.

The lifetime of BPDU receiving information is a max age value with a default value of 20 seconds according to the STP specification. However, the lifetime of RSTP receiving information, which can be obtained by improving the speed of a SPT, is set to three times the hello time value with a default time value of two seconds. Therefore, in an RSTP, if no BPDU is received for six seconds (at least three seconds) at its default, a topology starts to be re-configured so as to make communication available by another link.

During re-configuring a new topology, communication is not available on a network. For this reason, after re-configuring a topology, in order to make communication available by the new topology, the flush process of the filtering database (MAC table) in the bridge device is performed throughout the entire network. An MAC table stores the correspondence relationship between an MAC address and the port of a bridge device. In the flush process, the entries of ports that become unnecessary by the re-configuration of a topology are deleted from the MAC table of each bridge device. Therefore, in succeeding communication, no destination MAC address of a received frame often exists in the MAC table, and a lot of flooding in which a frame is transferred to all ports other than a receiving port is frequently caused.

This is described below with reference to FIGS. 1B and 1C. If no BPDU is received from the designated port 58 of the bridge device 56 in the root port 62 of the bridge device 59 for six seconds due to some failure, the bridge device 59 generates a new topology, and designates the port 61, which has been blocked for an alternate port, as a root port and blocks the port 62, which has been a root port, for an invalid port.

Thus, the frame transmitting/receiving route 64 between the terminals 51 and 63 is switched over to a route from the designated port 55 of the bridge device 52 to the port 61 of the bridge device 59.

However, the above-mentioned BPDU transmitting/receiving method has the following problems.

Regular BPDU transmission/reception is a very effective means for monitoring link failures. However, a problem occurs if the BPDU transmission stops for a specific time (in the case of RSTP, three times the hello time cycle) immediately after a BPDU transmission with no failure, in such a case as a software program built in each port is graded up in a bridge device.

Even if a software program for controlling BPDU transmission and the like, is stopping, a data communication service often has to be continued without instantaneous interruptions by performing a process of establishing a data path by hardware. In other words, in this case, there is no need for topology re-configuration and the flush of an MAC table, and it is preferable not to execute them.

However, in the conventional bridge device, a new topology is unnecessarily re-configured although a data path is available the same as before, and before the re-configuration is completed, many data paths in the network are made unavailable.

Therefore, in order to grade up the software program of a device operated by STP without interrupting the frame transfer service, the download of the software program and its initialization must be completed within the above-mentioned specific period. Although this specific time varies depending on the parameter value of a protocol, it usually is six seconds and is at least three seconds. It is practically impossible to complete the download and initialization of a software program within this period.

As disclosed by the above-mentioned Japanese Patent Application Laid-open No. 11-205368, a pseudo-BPDU can be generated during updating a software program by using hardware used to autonomously perform the BPDU transmitting process. However, in order to add a new hardware function to all bridge devices in a network, enormous labor and cost are needed.

Alternatively, memory can be duplicated by providing a CPU (central processing unit) with two segments of execution memory. In this case, while in one memory system a software program is executed, in the other memory system another software program can be loaded down. Then, the execution memory can be instantaneously switched over using the completion of the download as a trigger. This enables the stoppage time of the CPU to be shortened without being influenced by the download time of the software program. However, in this case, its installation cost increases due to the duplication.

Although the initialization of the CPU after the download of a software program can also be conducted within three seconds, in this case installation cost remarkably increases.

Furthermore, after being initialized, a bridge device that supports an STP transitionally transmits a BPDU in which the bridge device itself is designated as a root bridge device. In this case, since the opposing device performs the process considering that the topology has been changed when receiving the BPDU, the device temporarily stops the frame transfer service.

This can be avoided by providing a redundancy function to inherit a variety of STP parameters such as a port role and a port state, which dynamically change. However, in this case, too, installation cost increases, which is a problem.

SUMMARY OF THE INVENTION

It is an object of the present invention to provide a control packet processing apparatus and a method capable of performing an operation such as a software program updating without interrupting a data communication service.

It is another object of the present invention to achieve the above-mentioned objective by adding fewest new hardware functions as possible to a device that supports an STP.

The basic control packet processing apparatus of the present invention comprises a receiving device, a buffer device, a control device, a generation device, a transmitting device and an input device.

In a first aspect of the present invention, the control packet processing apparatus comprises a receiving device, a buffer device and a control device. The apparatus receives a control packet used to exchange a variety of information among devices that support the spanning tree protocol. The receiving device receives a control packet, and the buffer device stores the received control packet. The control device autonomously transfers the control packet stored in the buffer device to a processing unit for re-configuring the communication route of the spanning tree protocol in a certain cycle if no control packet is received for a certain period of time.

In a second aspect of the present invention, the control packet processing apparatus comprises a generation device and a transmitting device. The apparatus transmits a control packet used to exchange a variety of information among devices that support the spanning tree protocol. The generation device generates a control packet instructing to stop the transmission of a control packet to prevent the communication route of the spanning tree protocol from being re-configured if a receiving side device receives no control packet for a specific period of time. The transmitting device transmits the generated control packet.

In a third aspect of the present invention, the control packet processing apparatus comprises an input device and a transmitting device. The apparatus transmits a control packet used to exchange a variety of information among devices that support the spanning tree protocol. The input device inputs an instruction to start the automatic transmission of a control packet. In response to the input instruction, the transmitting device autonomously transmits control packets at specific intervals for a specific period of time from stop to restart of the operation of a processing unit that outputs a request to transmit a control packet.

BRIEF DESCRIPTION OF THE DRAWINGS

FIG. 1A shows the BPDU transmission/reception in a normal state;

FIG. 12 is a sequence chart showing BPDU transmission/reception in a normal state.

DESCRIPTION OF THE PREFERRED EMBODIMENTS

The preferred embodiments of the present invention are described below with reference to the drawings.

Figure 2A:
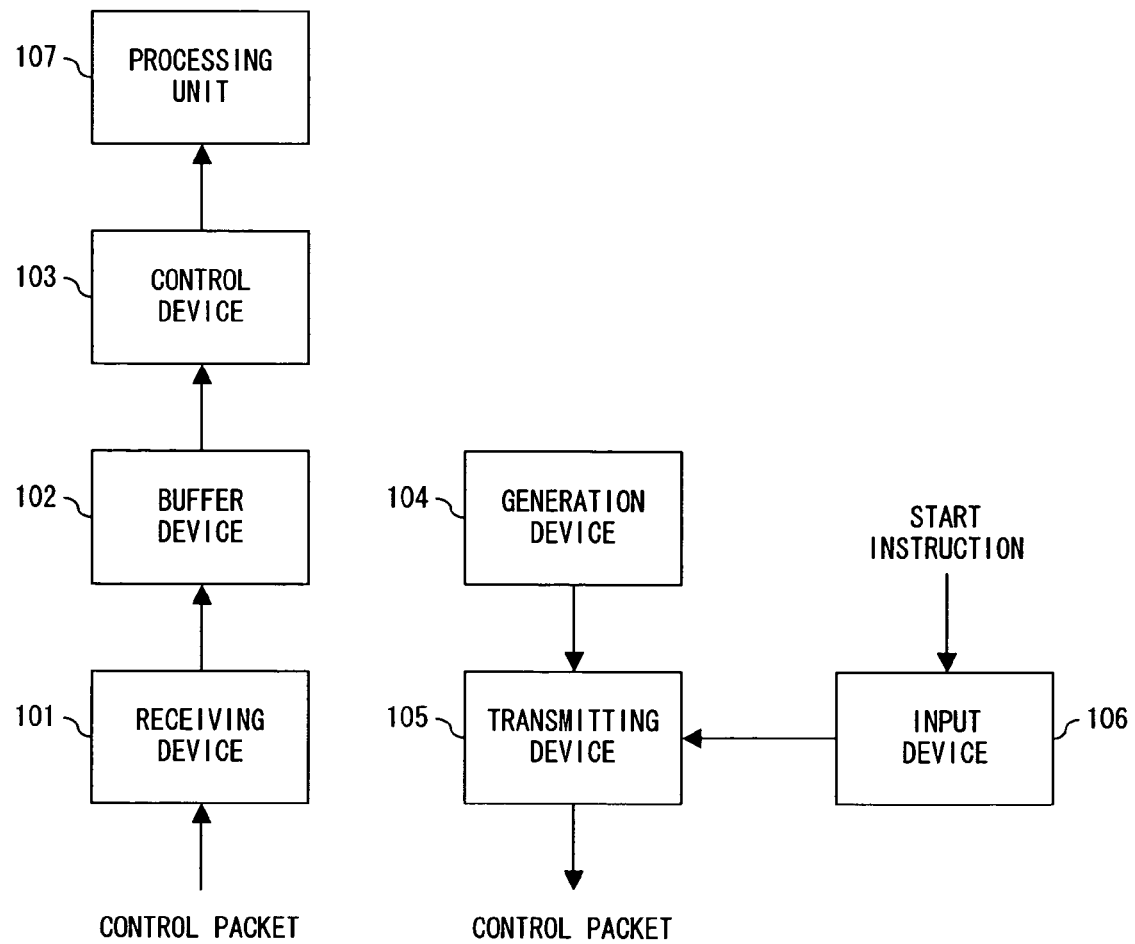
FIG. 2A shows the basic principle of a control packet processing apparatus of the present invention.

FIG. 2A shows the basic principle of a control packet processing apparatus of the present invention. The basic control packet processing apparatus shown in FIG. 2A comprises a receiving device 101, a buffer device 102, a control device 103, a generation device 104, a transmitting device 105 and an input device 106.

In a first aspect of the present invention, the control packet processing apparatus comprises a receiving device 101, a buffer device 102 and a control device 103, and performs the receiving process of a control packet used to exchange a variety of information among devices that support the spanning tree protocol. The receiving device 101 receives a control packet, and the buffer device 102 stores the received control packet. The control device 103 autonomously transfers the control packet stored in the buffer device 102 to a processing unit 107 that re-establishes the communication route of the spanning tree protocol in a specific cycle if no control packet is received for a specific period of time.

According to such a control packet processing apparatus, even if the transmission of a control packet is stopped to update the software program of a transmitting side device, the last control packet received in a receiving side device can be regularly transferred to the processing unit 107. Since the supply of control packets to the processing unit 107 is continued thus, topology re-configuration can be prevented.

In a second aspect of the present invention, the control packet processing apparatus comprises a generation device 104 and a transmitting device 105 to perform the transmission of a control packet used to exchange a variety of information among devices that support the spanning tree protocol. The generation device 104 generates a control packet instructing to stop transmitting a control packet to prevent the communication route of the spanning tree protocol from being re-configured in case when a receiving side device receives no control packet for a specific time. The transmitting device 105 transmits the generated control packet.

According to such a control packet processing apparatus, if control packet transmission is to be stopped to update the software program of a transmitting side apparatus, a control packet indicating to the effect is transmitted. This enables a receiving side device to recognize the stoppage of the control packet transmission, and the topology re-configuration can be properly suppressed.

Furthermore, in the control packet processing apparatus in the first or second aspect of the present invention, if the functions of the control device 103 and generation device 104 are added as software for processing the BPDU transmission/reception of a device that supports the spanning tree protocol, this enables topology re-configuration to be prevented without adding any new hardware function.

In a third aspect of the present invention, a control packet processing apparatus comprises an input device 106 and a transmitting device 105. The apparatus transmits a control packet used to exchange a variety of information among devices that support the spanning tree protocol. The input device 106 inputs an instruction to start the automatic transmission of a control packet. In response to the instruction, the transmitting device 105 autonomously transmits control packets at specific intervals for a specific period of time from stop to restart of the operation of a processing unit 107 that outputs a control packet transmit request.

According to such a control packet processing apparatus, by inputting a start instruction prior to, e.g., updating the software program of a transmitting side device, a control packet can be automatically transmitted to a receiving side device even after the processing unit 107 stops. This prevents the topology re-configuration in the receiving side dence.

Furthermore, in the control packet processing apparatus in the third aspect of the present invention, if the function of the input device 106 is added as a software function of a device that supports the spanning tree protocol and the function of the transmitting device 105 is added as a software function that process the BPDU transmission/reception, topology re-configuration can be suppressed without adding any new hardware function.

The receiving device 101 corresponds to, e.g., the BPDU extraction unit 223 shown in FIGS. 4, 6 or 8, which is described later, and the buffer device 102 corresponds to, e.g., the latest BPDU storage buffer 414 shown in FIGS. 4, 6 or 8. The control device 103 corresponds to, e.g., the BPDU receiving driver 403, 601 and 801 shown in FIGS. 4, 6 and 8, respectively.

The generation device 104 corresponds to, e.g., the BPDU transmitting driver 501 or the BPDU transmitting driver 701 shown in FIG. 7, which both are described later. The transmitting device 105 corresponds to, e.g., the line card 202 shown in FIG. 2B, the BPDU transmitting unit 224 shown in FIG. 5 or the control packet transmitting unit 702 shown in FIG. 7, which are all described later. The input device 106 corresponds to, e.g., the user interface program 401 shown in FIG. 11, which is described later. The processing unit 107 corresponds to, e.g., the STP protocol processing program 402 shown in any of FIGS. 4-8 and 11.

According to the present invention, in a device that supports the spanning tree protocol, such as a bridge device or a router, an interruption-free data communication service can be provided without service stoppage due to spanning tree re-configuration even in a state where BPDU transmission is temporarily made unavailable due to software upgrade and the like.

By adding functions required to suppress spanning tree re-configuration to a bridge device and the like by software, the above-mentioned interruption-free data communication service can be realized without adding any new hardware function.

In a first preferred embodiment, in a BPDU receiving driver installed in the BPDU receiving side of a bridge device, an STP protocol processing program can be made to falsely recognize the reception of a BPDU while BPDU transmission is intentionally stopped in an opposing bridge device. As a result, without adding any new hardware function, the update of a software program built in each port can be realized without service stoppage.

In other words, an interruption-free service can be realized without adding an autonomous BPDU transmitting function by hardware, only by the functional addition to a driver processing BPDU transmission/reception.

Figure 2B:
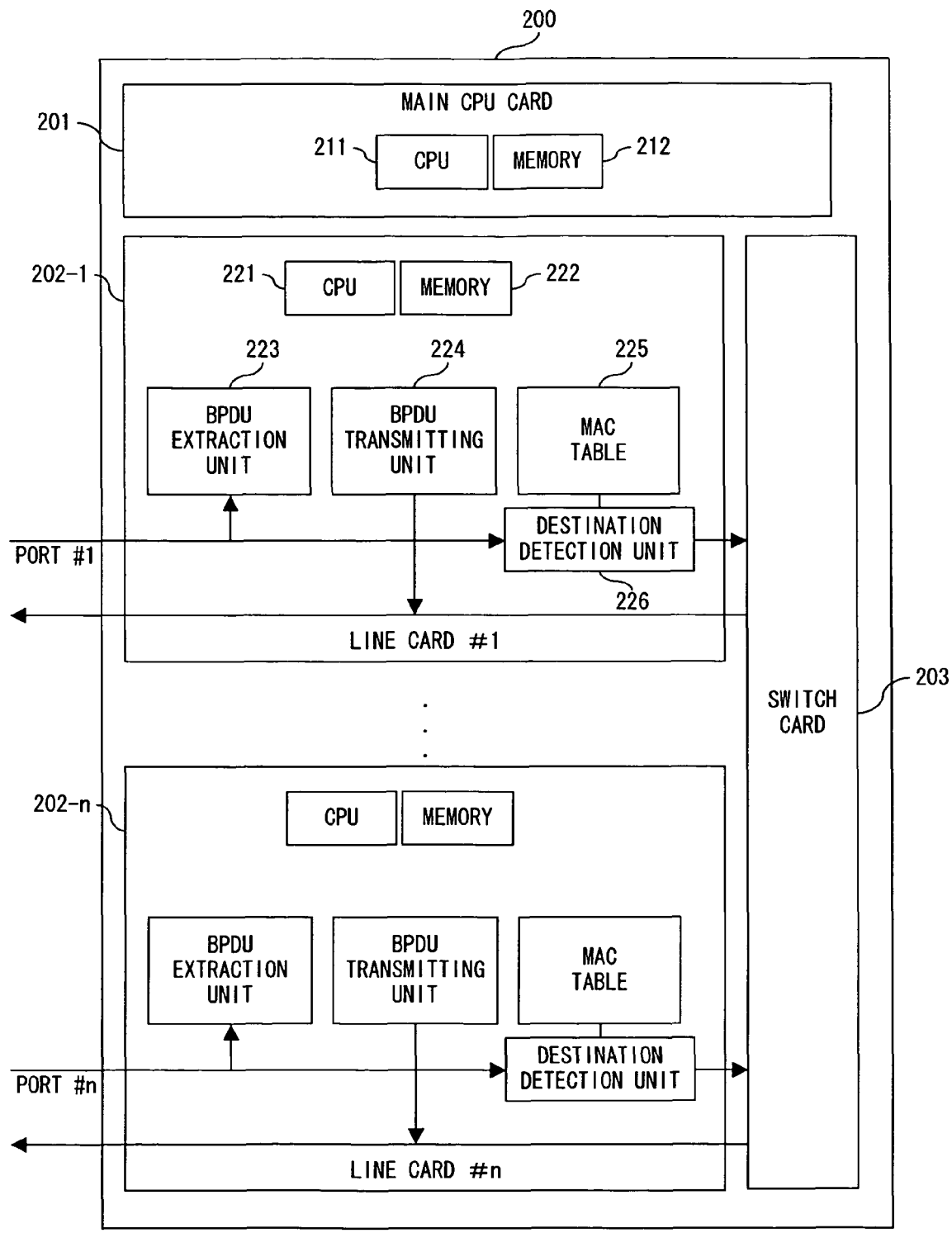
FIG. 2B shows an exemplary configuration of the bridge device.

FIG. 2B shows the hardware configuration of the bridge device in the first preferred embodiment. The bridge device 200 shown in FIG. 2B comprises a main CPU card 201, n line cards for ports #1 through #n, 202-1 #1) through 202-n (#n) and a switch card 203.

The main CPU card 201 comprises a CPU 211 and memory 212. For the memory 212, a ROM (read-only memory) a RAM (random-access memory) or the like is used, and the memory 212 stores a program and data, which are used for the process. The CPU 211 performs processes required to support the spanning tree protocol by using the memory 212 to execute a user interface program and an STP protocol processing program.

Each line card comprises a CPU 221, memory 222, a BPDU extraction unit 223, a BPDU transmission unit 224, an MAC table 225 and a destination retrieval unit 226, and it controls the transmission/reception of packets by each port. Although in this example, one line card is provided for each port, one line card can also accommodate a plurality of ports.

For the memory 222, a ROM, a RAM and the like are used, and the memory 222 stores a program and data, which are used for the process. The CPU 221 performs processes required to control the transmission/reception of BPDUs by using the memory 222 to execute the programs of the BPDU receiving and transmitting drivers.

The BPDU extraction unit 223 extracts a BPDU from a packet received from another bridge device and transfers it to the BPDU receiving driver. The BPDU transmitting unit 224 transmits a BPDU received from the BPDU transmitting driver to another bridge device.

The MAC table 225 stores a set of the MAC address and port identification information of a bridge device. The destination retrieval unit 226 retrieves port identification information corresponding to the destination MAC address of a received packet from the MAC table, and inputs the packet to the switch card 203 using the port as a destination. The switch card 203 comprises a switch switching over a route, and transfers the packet input from each line card to a line card with the destination port.

Figure 3:
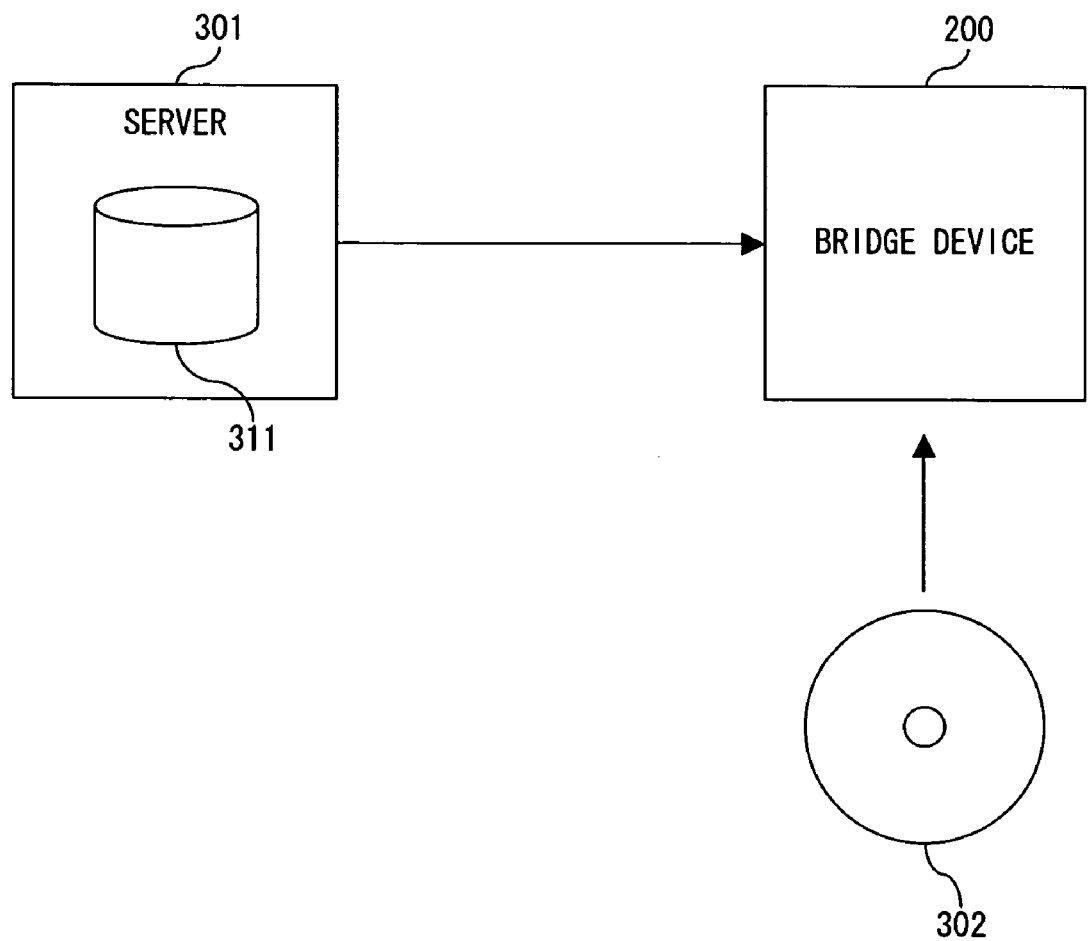
FIG. 3 shows a loading method of a program.

FIG. 3 shows how to load the program and data required by the bridge device 200 shown in FIG. 2B. The program and data are stored in a database 311 of a server 301 or a portable storage medium 302, and are loaded into the memory 212 or 222 of the bridge device 200. For the portable storage medium 302, an arbitrary computer-readable storage medium such as a memory card, a flexible disk, an optical disk, a magneto-optical disk is used.

The server 301 generates a carrier signal for carrying the program and data, and transmits them to the bridge device 200 through a transmission medium on a network. The CPU 211 or 221 performs necessary processes by using the loaded data and executing the loaded program.

Next, the BPDU transmitting/receiving methods of the bridge device 200 will be described with reference to FIGS. 4 through 8. Both the user interface program 401 and the STP protocol processing program 402 used in these methods are stored in the main CPU card 201, and both the BPDU receiving driver 403 and the BPDU transmitting driver 501 are installed in each line card. These programs are software programs to be updated.

Figure 4:
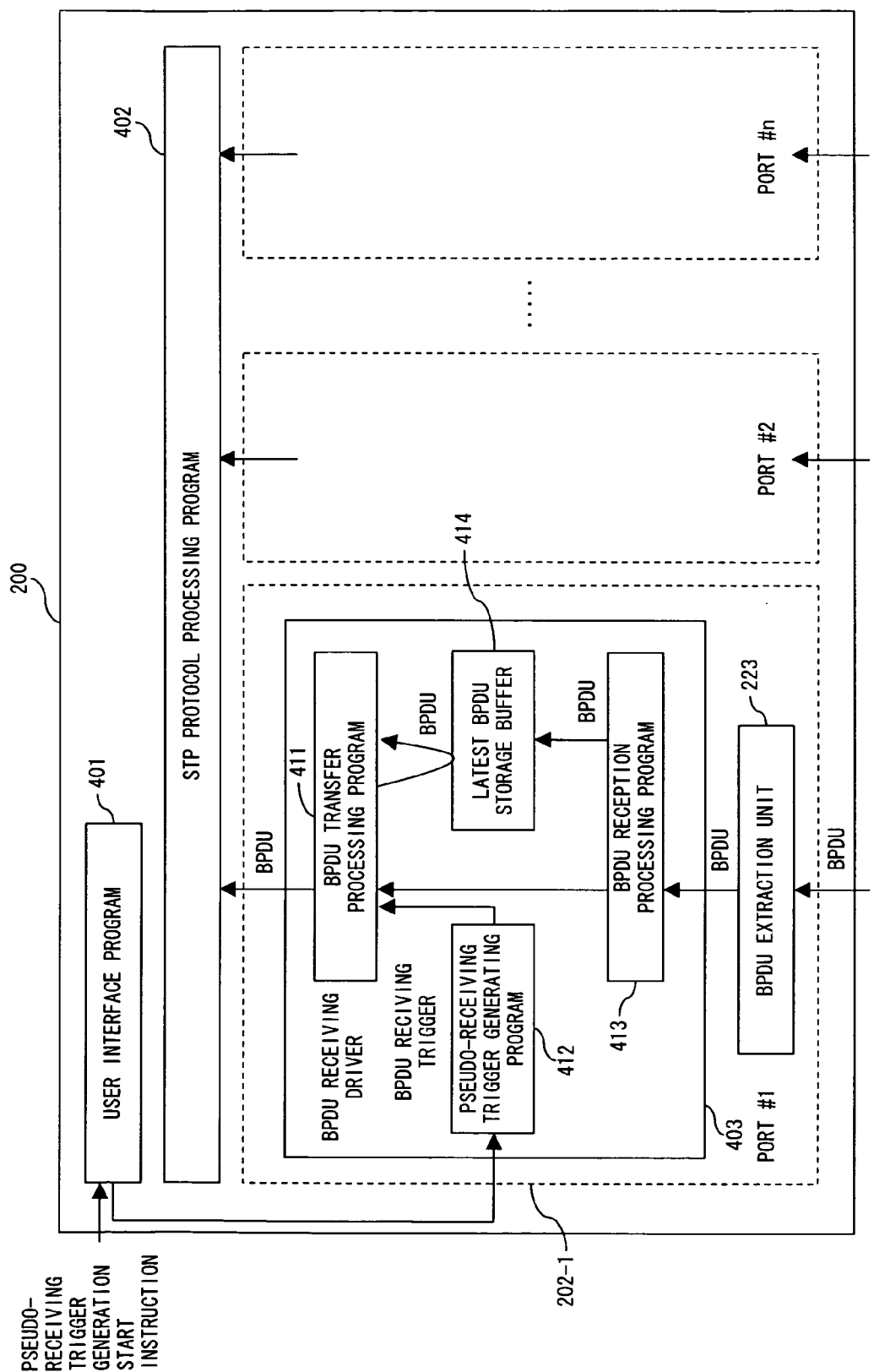
FIG. 4 shows a first BPDU receiving method.

In the BPDU receiving method shown in FIG. 4, during the stoppage of BPDU transmission, an interruption-free service can be realized by the function of the BPDU receiving driver 403 for BPDU reception processing. In this case, the BPDU receiving driver 403 comprises a BPDU transfer processing program 411, a pseudo-receiving trigger generating program 412 and a BPDU reception processing program 413, and controls reception by using a latest BPDU storage buffer 414 provided in the memory 222.

The BPDU transfer processing program 411 and the BPDU reception processing program 413 provides an interface to each of the STP protocol processing program 402 and the BPDU extracting device 223, respectively.

The user interface program 401 provides an interface to a user. The STP protocol processing program 402 uniquely determines a frame relay route between bridge devices by prohibiting a data frame relay through a specific port when a physically redundant communication route exists between arbitrary bridge devices on a network. Specifically, when detecting a state where no BPDU is received for a specific period, the STP protocol processing program 402 performs processes required to generate a topology, such as the computation of the cost value of a communication route, port blocking and the like in order to generates a new topology.

In usual BPDU reception, the BPDU reception processing program 413 stores the BPDU received from the BPDU extraction unit 223 in the latest BPDU storage buffer 414 and then supplies the BPDU transfer processing program 411 with a BPDU receiving trigger. Upon receipt of this trigger, the BPDU transfer processing program 411 extracts the latest BPDU from the latest BPDU storage buffer 414 and transfers the latest BPDU to the STP protocol processing program 402.

On the other hand, if BPDU transmission is stopped due to software update or the like in the opposing bridge device, i.e., the BPDU transmitter, an instruction to start generating a pseudo-receiving trigger is in advance issued from an external network management device to the user interface program 401. The user interface program 401, transfers the received instruction to the pseudo-receiving trigger generating program 412, which starts regularly supplying the BPDU transfer processing program with a BPDU receiving trigger.

The cycle of trigger generation is most preferably set to a hello value in the BPDU stored in the latest BPDU storing buffer 414. It can also be fixed to two seconds.

Thus, even if BPDU transmission/reception is not actually conducted and the information of the latest BPDU storage buffer 414 is not updated yet, the BPDU transfer processing program 411 can extract the BPDU stored in the latest BPDU storage buffer 414 and regularly notify the STP protocol processing program 402 of the BPDU by receiving a pseudo-BPDU receiving trigger. Accordingly, topology re-configuration can be prevented by the STP protocol processing program 402.

Then, when the opposing bridge device returns to a state where BPDU transmission can be restarted, an instruction to stop generating a pseudo-receiving trigger is issued from the network management device to the user interface program 401. The user interface program 401 transfers this instruction to the pseudo-receiving trigger generating program 412, and the pseudo-receiving trigger generating program 412 stops supplying the BPDU transfer processing program 411 with BPDU receiving triggers.

Figure 5:
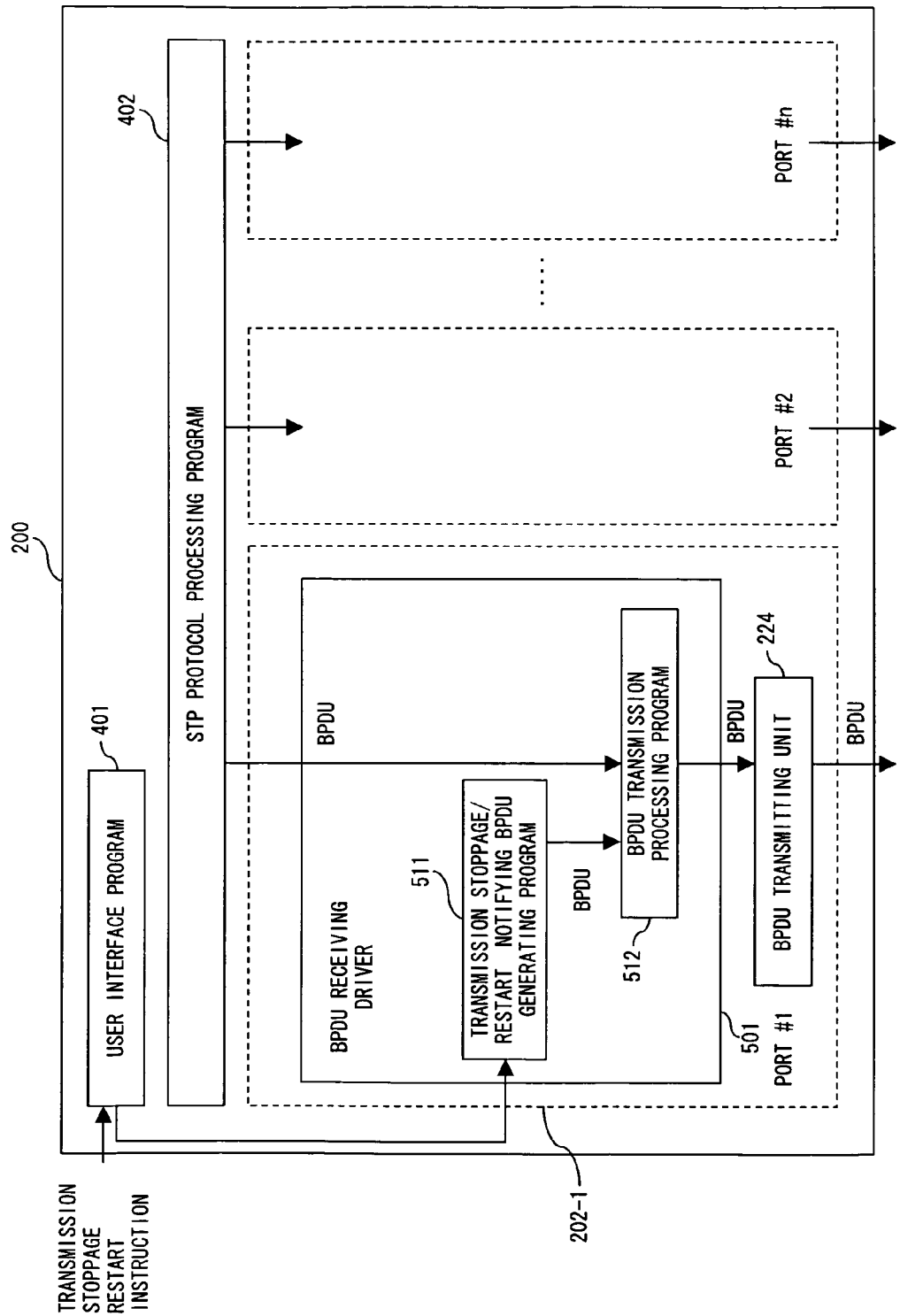
FIG. 5 shows a first BPDU transmitting method.
Figure 6:
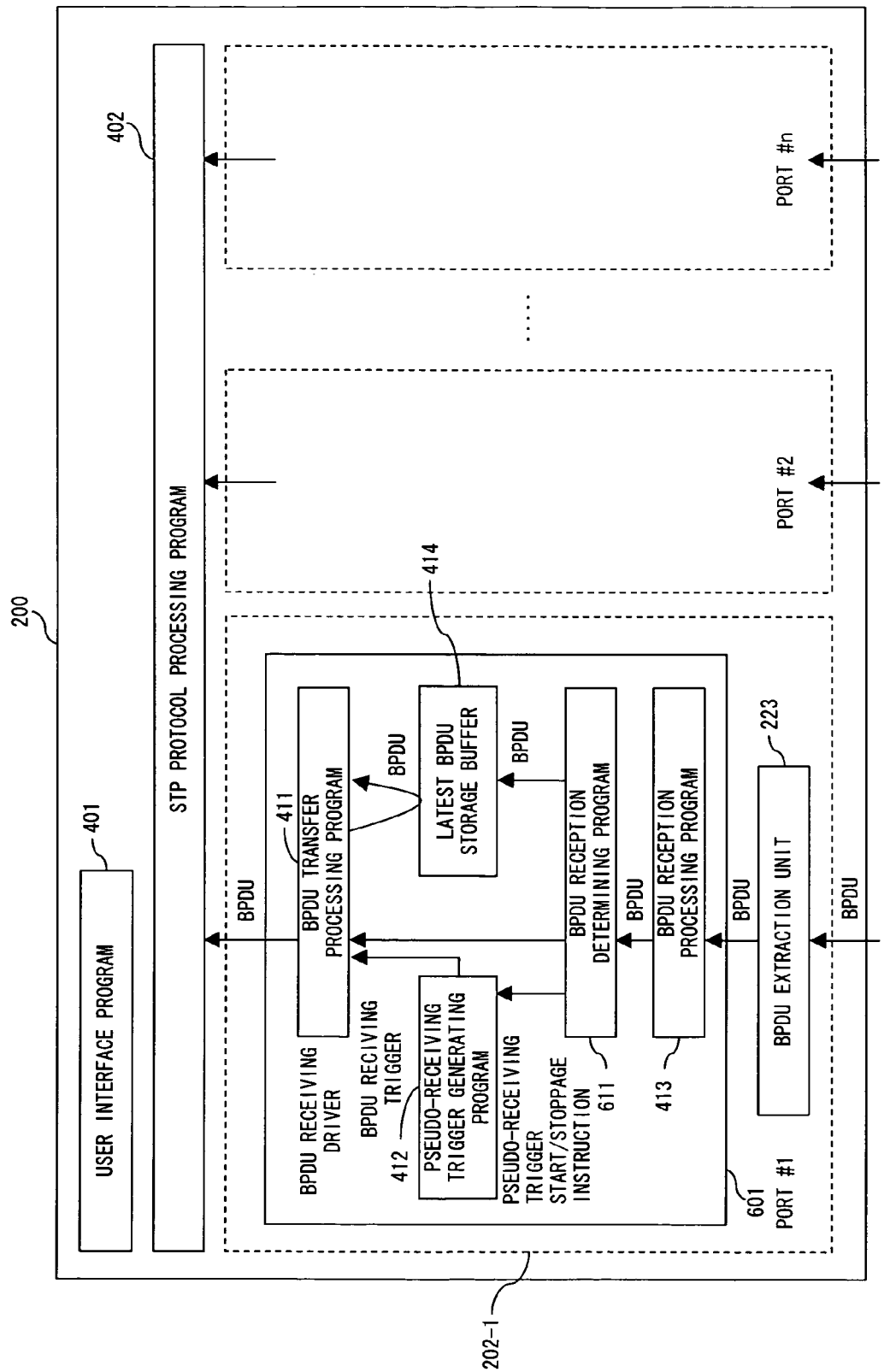
FIG. 6 shows a second BPDU receiving method.

In the transmitting and receiving methods shown in FIGS. 5 and 6, information indicative of transmission stop and restart is transferred between bridge devices by adding the information to a BPDU. Thus, timing for stopping BPDU transmission and timing for restarting it can be notified between bridge devices without using an external network management device.

As shown in FIG. 5, the BPDU transmitting driver 501 in the BPDU transmitting side comprises a transmission stoppage/restart notifying BPDU generating program 511 and a BPDU transmission processing program 512. The BPDU transmission processing program 512 provides an interface to the BPDU transmitting unit 224.

At the time of normal BPDU transmission, the STP protocol processing program 402 transfers a transmission BPDU to the BPDU transmission processing program 512. Then, the BPDU transmission processing program 512 controls the BPDU transmission unit 224 to transmit the received BPDU.

On the other hand, if BPDU transmission is to be stopped due to software update or the like, an instruction to stop BPDU transmission is in advance issued from the outside to the user interface program 401. The user interface program 401 transfers this instruction to the transmission stoppage/restart notifying BPDU generating program 511, which then generates a BPDU with a "transmission stoppage flag" set, and transfers the BPDU to the BPDU transmission processing program 512. Thus, a BPDU containing a "transmission stoppage flag" is transmitted from the bridge device.

However, since a BPDU specified by IEEE standards has no field for a "transmission stoppage flag", a rule that in a specific field, a specific value which is not used at the time of normal BPDU transmission, is used as a "transmission stoppage flag", must be set in advance. For example, since in the protocol version identifier field (one byte) of a BPDU, values of four or more are not normally used, a rule is used that if a value of 0xff is used, the value is handled as a "transmission stoppage flag".

As shown in FIG. 6, on the BPDU receiving side, the BPDU receiving driver 601 comprises a BPDU transfer processing program 411, a pseudo-receiving trigger generating program 412, a BPDU reception processing program 413 and a BPDU reception determining program 611.

When the BPDU extraction unit 223 receives a BPDU, the BPDU reception processing program 413 receives the BPDU from the BPDU extraction unit 223 and transfers the BPDU to the BPDU reception determining program 611. The BPDU reception determining program 611 determines whether the BPDU contains a "transmission stoppage flag". If the "transmission stoppage flag" is not contained, the program 611 determines that the BPDU is an ordinary BPDU, then, stores the BPDU in the latest BPDU storage buffer 414 and supplies the BPDU transfer processing program 411 with a BPDU receiving trigger. Upon receipt of this trigger, the BPDU transfer processing program 411 extracts the BPDU from the latest BPDU storage buffer 414 and transfers the BPDU to the STP protocol processing program 402.

If the received BPDU contains a "transmission stoppage flag", the BPDU reception determining program 611, instead of storing the BPDU in the buffer 414, issues an instruction to start generating a pseudo-receiving trigger to the pseudo-receiving trigger generating program 412. Upon receipt of this instruction, the pseudo-receiving trigger generating program 412 starts regularly supplying the BPDU transfer processing program 411 with BPDU receiving triggers.

Thus, even in a state where any normal BPDU is not received at all, the BPDU stored in the latest BPDU storage buffer 414 is regularly transferred to the STP protocol processing program 402, which prevents the topology re-configuration by the STP protocol processing program 402.

Also, when software update or the like is completed and the bridge device recovers from the BPDU transmission stoppage state, the generation of a pseudo-receiving trigger by the pseudo-receiving trigger generating program 412 must be stopped.

Therefore, an instruction to restart the BPDU transmission is issued from the outside to the user interface program 401. The user interface program 401 transfers this instruction to the transmission stoppage/restart notifying BPDU generating program 511, which then generates a BPDU with a "transmission restart flag" set, and transfers the BPDU to the BPDU transmission processing program 512. The filed value of a "transmission restart flag" must be determined in advance. Thus, a BPDU containing a "transmission restart flag" is transmitted from the bridge device.

Then, in the bridge device shown in FIG. 6, the BPDU reception determining program 611 determines whether a received BPDU contains a "transmission restart flag". If a "transmission restart flag" is contained, an instruction to stop generating a pseudo-receiving trigger is issued. Thus, the pseudo-receiving trigger generating program 412 stops supplying the BPDU transfer processing program 411 with a BPDU receiving trigger.

Alternatively, in the BPDU transmitting and receiving methods shown in FIGS. 5 and 6, the generation stoppage of a pseudo-receiving trigger by the pseudo-receiving trigger generating program can also be instructed by restarting a normal BPDU transmission, without the transmission/reception of a BPDU with a "transmission restart flag" set.

In this case, on the BPDU transmitting side, no BPDU for restart notification is not generated. On the receiving side, when receiving a BPDU other than that with a "transmission restart flag" set, the BPDU reception determining program 611 always or once in a plurality of times instructs the pseudo-receiving trigger generating program 412 to stop generating a pseudo-receiving trigger.

Figure 7:
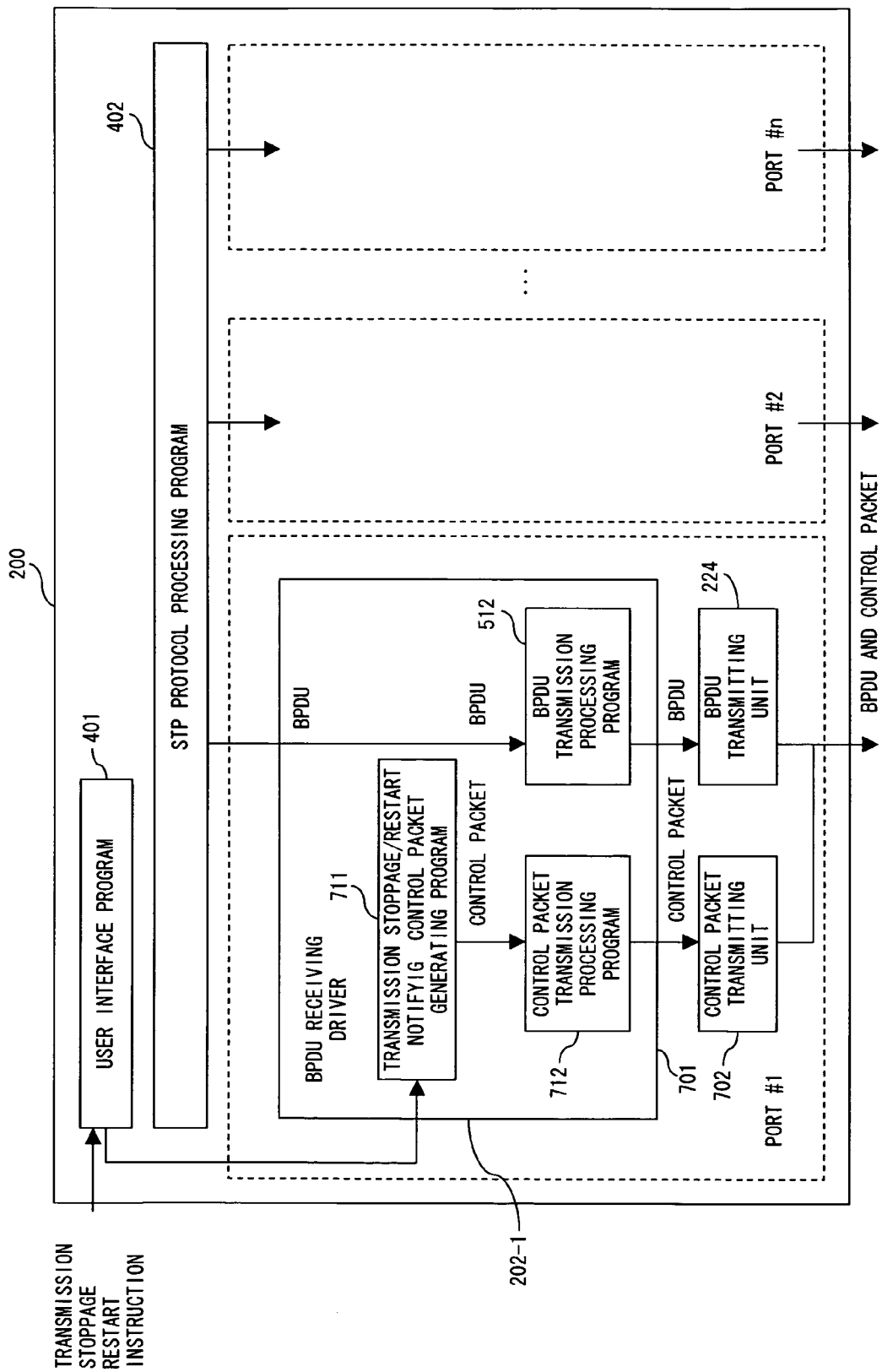
FIG. 7 shows a second BPDU transmitting method.
Figure 8:
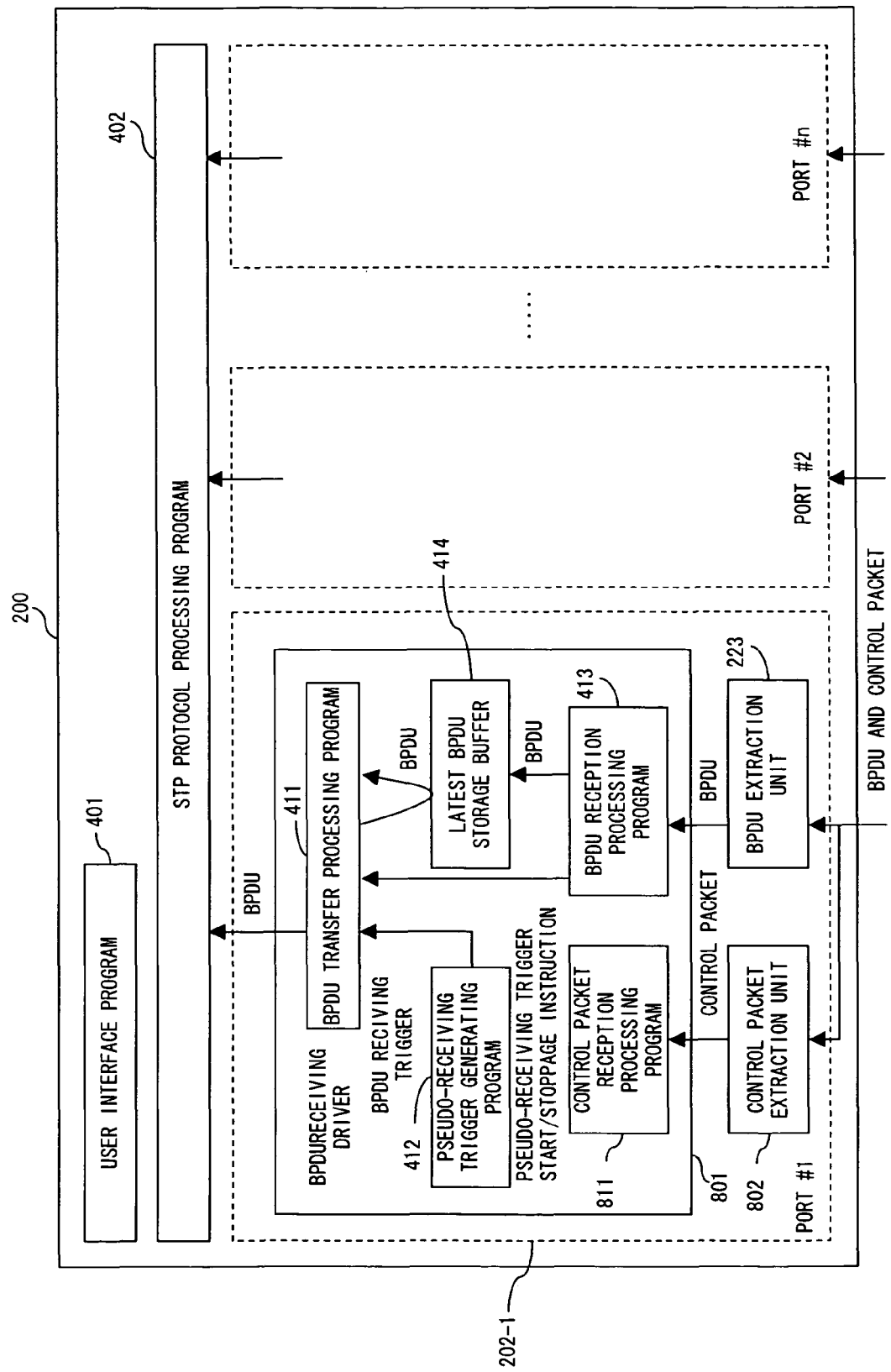
FIG. 8 shows a third BPDU receiving method.

Although the transmitting and receiving methods shown in FIGS. 7 and 8, respectively, are similar to those shown in FIGS. 5 and 6, the former differs from the latter in using another control packet instead of the BPDU with a "transmission restart flag" or "transmission stoppage flag" set. In the case of using another control packet, timing for stopping BPDU transmission and timing for BPDU restarting can also be notified between bridge devices without using an external network management device.

This method requires a condition that a control packet other than a BPDU can be transmitted/received by hardware. However, this method is effective if the modification of a BPDU format specified by IEEE standards is not allowed at all. Each line card is provided as with such a hardware function with the control packet transmitting unit 702 shown in FIG. 7 and the control packet extraction unit 802 shown in FIG. 8.

As shown in FIG. 7, the control packet transmitting unit 702 on the BPDU transmitting side transmits a control packet received from the BPDU transmitting driver 701 to another bridge device. The BPDU transmitting driver 701 comprises a control packet generating program 711 for transmission stoppage/restart, a control packet transmission processing program 712 and a BPDU transmission processing program 512. The control packet transmission processing program 712 provides an interface to the control packet transmitting unit 702.

At the time of normal BPDU transmission, the STP protocol processing program 402 transfers a transmission BPDU to the BPDU transmission processing program 512, and the BPDU transmission processing program 512 controls the BPDU transmitting unit 224 to transmit the received BPDU.

However, if BPDU transmission is to be stopped for software update or the like, an instruction to stop BPDU transmission is in advance issued from the outside to the user interface program 401. The user interface program 401 transfers this instruction to the BPDU generating program 711 for transmission stoppage/restart notification. Then, the BPDU generating program 711 for transmission stoppage/restart notification generates a control packet for transmission stoppage notification instructing transmission stoppage and transfers the control packet to the BPDU transmission processing program 712. Thus, a control packet for transmission stoppage notification is transmitted from the bridge device.

However, on the BPDU receiving side, as shown in FIG. 8, the control packet extraction unit 802 extracts a control packet for transmission stoppage/restart notification from the packets received from another bridge device and transfers the control packet to the BPDU receiving driver 801. The BPDU receiving driver 801 comprises a BPDU transfer processing program 411, a pseudo-receiving trigger generating program 412, a BPDU reception processing program 413 and a control packet reception processing program 811. The control packet reception processing program 811 provides an interface to the control packet extraction unit 802.

When the BPDU extraction unit 223 receives a BPDU, the BPDU reception processing program 413 receives the BPDU from the BPDU extraction unit 223 and stores the BPDU in the latest BPDU storage buffer 414. Then, the program 413 supplies the BPDU transfer processing program 411 with a BPDU receiving trigger. Upon receipt of the trigger, the BPDU transfer processing program 411 extracts the BPDU from the latest BPDU storage buffer 414 and transfers the BPDU to the STP protocol processing program 402.

If the control packet extraction unit 802 receives a control packet for transmission stoppage notification, the control packet reception processing program 811 receives the control packet from the control packet extraction unit 802 and instructs the pseudo-receiving trigger generating program 412 to start generating a pseudo-receiving trigger. Upon receipt of this instruction, the pseudo-receiving trigger generating program 412 starts regularly supplying the BPDU transfer processing program 411 with a BPDU receiving trigger.

Thus, even in a state where any normal BPDU is not received at all, the BPDU stored in the latest BPDU storage buffer 414 is regularly transferred to the STP protocol processing program 402, and accordingly topology re-configuration by the STP protocol processing program 402 can be prevented.

When software update or the like is completed and the bridge device recovers from the BPDU transmission stoppage state, in the bridge device shown in FIG. 7, an instruction to restart BPDU transmission is given to the user interface program 401 from the outside. The user interface program 401 transfers this instruction to the control packet generating program 711 for transmission stoppage/restart notification. Then, the control packet generating program 711 for transmission stoppage/restart notification generates a control packet for transmission restart notification instructing transmission restart, and transfers the packet to the control packet transmission processing program 712. Thus, a control packet for transmission restart notification is transmitted from the bridge device.

In the bridge device shown in FIG. 8, when the control packet extraction unit 802 receives the control packet for transmission restart notification, the control packet reception processing program 811 receives the control packet from the control packet extracting device 802 and gives an instruction to stop generating a pseudo-receiving trigger, to the pseudo-receiving trigger generating program 412. Thus, the pseudo-receiving trigger generating program 412 stops supplying the BPDU transfer processing program 411 with a BPDU trigger.

In the transmitting and receiving methods shown in FIGS. 7 and 8, respectively, the generation stoppage of a pseudo-receiving trigger by the pseudo-receiving trigger generating program can also be instructed by restarting a normal BPDU transmission, without the transmission/reception of a control packet for transmission restart notification.

In this case, on the BPDU transmitting side, no control packet for transmission restart notification is generated. On the BPDU receiving side, when receiving a BPDU, the BPDU reception processing program 413 always or once in a plurality of times instructs the pseudo-receiving trigger generating program 412 to stop generating a pseudo-receiving trigger.

Next, the software update procedure of the bridge device in the first preferred embodiment is described with reference to FIGS. 9 and 10.

Figure 9:
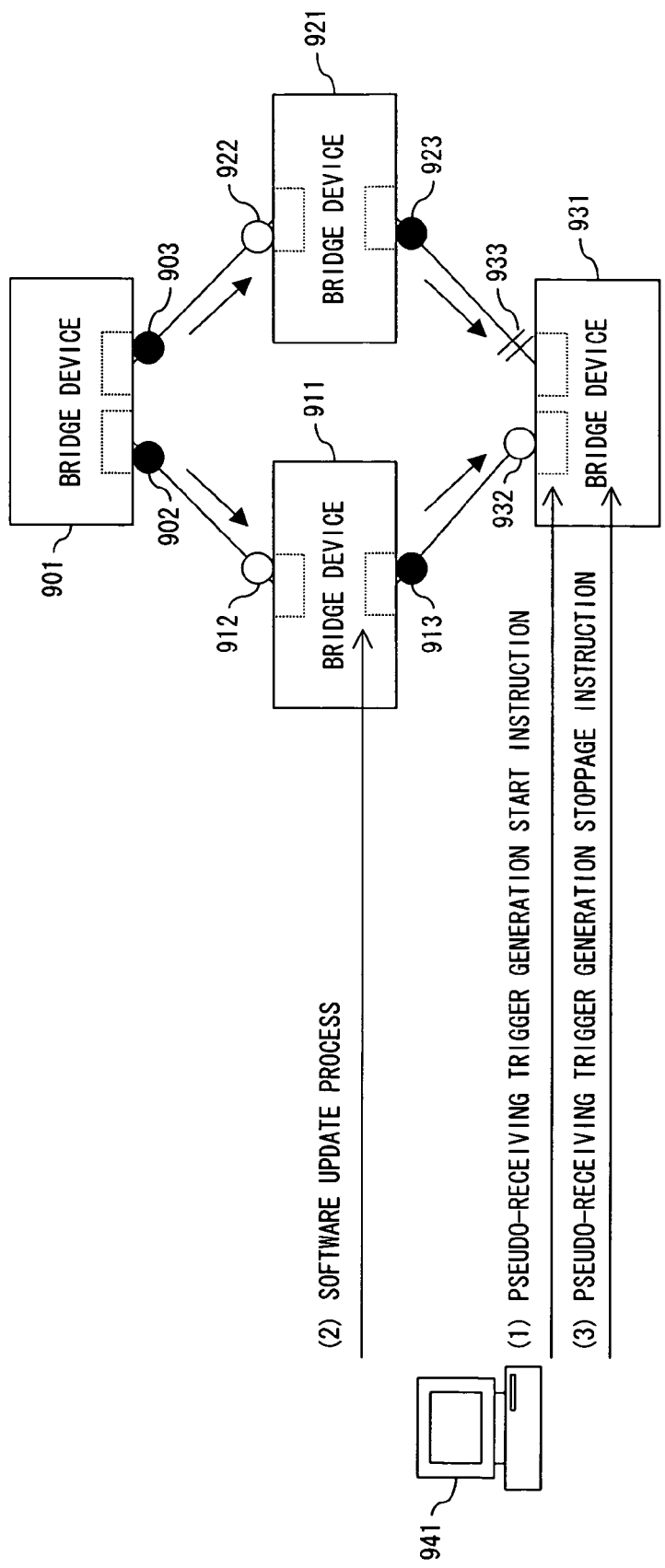
FIG. 9 shows a first software updating method.

In the configuration shown in FIG. 9, in addition to a network comprising bridge devices 901, 911, 921 and 931, which are operated by the spanning tree protocol, a network management device 941 for monitoring/controlling all the bridge devices exists.

In this case, the bridge device 901 is assigned to a root bridge, and BPDUs are transmitted from designated ports 902 and 903 to the root port 912 of the bridge device 911 and the root port 922 of the bridge device 921, respectively. A BPDU is transmitted from the designated port 913 of the bridge device 911 to the root port 932 of the bridge device 931. The port 933 of the bridge device 931 which port is opposing to the designated port 923 of the bridge device 921 is blocked as an alternate port.

In this case, if a part or all of the bridge devices support the BPDU receiving method shown in FIG. 4, an interruption-free data communication service can be provided without causing a topology re-configuration even in a state where in a specific or arbitrary bridge device, BPDU transmission is stopped due to software update.

For example, when the software of the bridge device 911 shown in FIG. 9 is updated, the network management device 941 controls the bridge devices as follows:

(1) Firstly, the network management device 941 instructs a port located downstream from the bridge device 911 in a BPDU flow, i.e., the port 932 of the bridge device 931, which is connected to the bridge device 921, to start generating a pseudo-receiving trigger. Thus, the bridge device 931 regularly transfers information about the previously received latest BPDU to the STP protocol processing program, regardless of whether the bridge device 911 transmits a BPDU.

(2) Then, the network management device 941 updates the software of the bridge device 911. In this case, BPDU transmission from the bridge device 911 is stopped. However, in the bridge device 931, pseudo BPDUs are continuously supplied to the STP protocol processing program.

(3) Finally, after the software update of the bridge device 911 is completed and the device 911 enters a state where BPDU transmission can be restarted, the network management device 941 instructs the bridge device 931 to stop generating a pseudo-receiving trigger. Thus, the bridge device 931 stops regularly transferring information about the previously received latest BPDU to the STP protocol processing program and returns to a normal state where no BPDU is transmitted to the STP protocol processing program unless it actually receives a BPDU.

While the above-mentioned processes (1) through (3) are performed, an interruption-free data communication service is continued because topology is not re-configured across the entire network.

Figure 10:
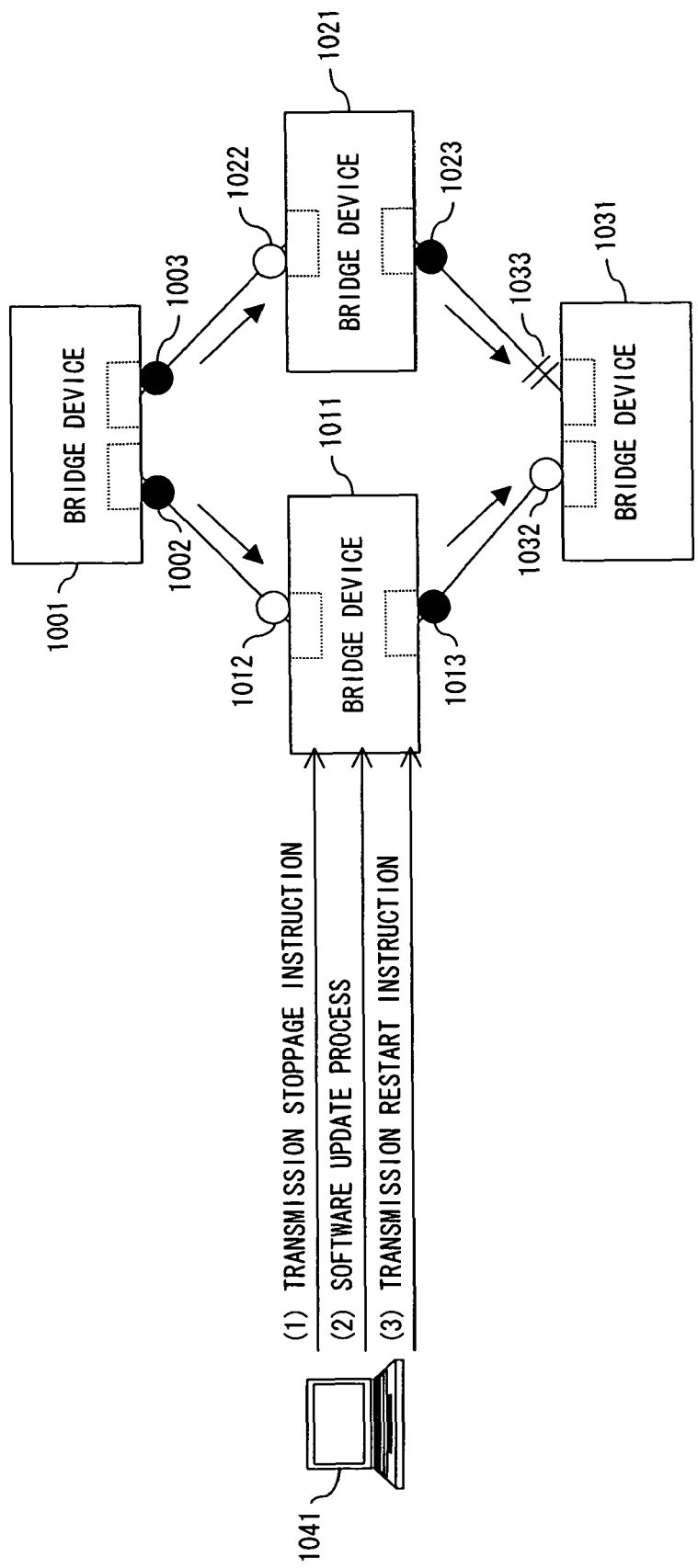
FIG. 10 shows a second software updating method.

In the configuration shown in FIG. 10, although the network comprising bridge devices 1001, 1011, 1021 and 1031, which are all operated by the spanning tree protocol, is similar to that of FIG. 9, no network management device exists. Each bridge device is connected to a simple terminal 1041, which is equipped with a CLI (command line interface) and which enables commands to be input to the bridge device, and can be controlled by inputting a command from the terminal 1041.

In this case, the designated ports 1002 and 1003 of the bridge device 1001, the root port 1012 and designated port 1013 of the bridge device 1011, the root port 1022 and designated port 1023 of the bridge device 1021, and the root port 1032 and alternate port 1033 of the bridge device 1031 play the same roles as in case of FIG. 9.

In such a bridge device managing form, i.e., in a form where no device for collectively managing a plurality of bridge devices exists, it is difficult to jointly operate a plurality of bridge devices as in FIG. 9. Therefore, in this case, the generation of a pseudo-receiving trigger is started/stopped using the BPDU transmitting and receiving methods shown in FIGS. 5 and 6, respectively.

For example, when the software of the bridge device 1011 shown in FIG. 10 is updated, bridge devices are controlled by the simple terminal 1041 as follows:

(1) Firstly, the simple terminal 1041 instructs the bridge device 1011 to stop transmission. Thus, the bridge device 1011 transmits a BPDU with a "transmission stoppage flag" set to the bridge device 1031. Upon receipt of this instruction, the bridge device 1031 recognizes the "transmission stoppage flag" and regularly transfers the BPDU stored in the latest BPDU storage buffer to the STP protocol processing program.

(2) Then, the simple terminal 1041 updates the software of the bridge device 1011. In this case, the BPDU transmission from the bridge device 1011 is stopped. However, in the bridge device 1031, pseudo BPDUs are continuously supplied to the STP protocol processing program during this period.

(3) Lastly, after the software update of the bridge device 1011 is completed and the device 1011 enters a state where BPDU transmission can be restarted, the simple terminal 1041 instructs the bridge device 1011 to restart transmission. Thus, the bridge device 1011 transmits a BPDU with a "transmission restart flag" set to the bridge device 1031. Upon receipt of this BPDU, the bridge device 1031 recognizes the "transmission restart flag" and stops regularly transferring the BPDU stored in the latest BPDU storage buffer to the STP protocol processing program. Thus, the bridge device 1031 returns to a normal state where no BPDU is transmitted to the STP protocol processing program unless it actually receives a BPDU.

While the above-mentioned processes (1) through (3) are performed, an interruption-free data communication service is continued as in FIG. 9.

By directly performing the process (2) omitting the process (1) in the control procedure of the simple terminal 1041, the user interface program of the bridge device 1011 can also instructs the BPDU transmitting driver to stop transmission prior to the software update.

Furthermore, if a BPDU with a "transmission restart flag" set is not used, the process (3) can also be omitted. In this case, the simple terminal 1041 can control the bridge device 1011 only by inputting a software update command in a conventional manner.

If a control packet is transmitted/received instead of a BPDU with a "transmission stoppage flag" or "transmission restart flag" set, using the BPDU transmitting and receiving methods shown in FIGS. 7 and 8, respectively, any modification of a BPDU format can be done without.

In a first preferred embodiment described above, by providing a bridge device located downstream from a bridge device whose software is to be updated, with a pseudo-receiving trigger generating function, the generation of topology re-configuration is suppressed. However, the generation of topology re-configuration can also be suppressed without adding any new function to a bridge device located downstream. Such a second preferred embodiment is described below.

In a second preferred embodiment, mainly the following three segments of control (A) through (C) are performed.

(A) An opposing bridge device connected to the designated port of a job-target bridge device is made not to detect a change in topology.

The detection of a change in topology of the opposing bridge device can be prevented by continuing BPDU transmission by the port control unit of the job-target bridge device. The port control unit corresponds to the line card 202 shown in FIG. 2B, and can be operated independently of the main CPU card 201. Specifically, such control is performed as follows.

(1) The CPU 211 of the main line card 201 instructs the port control unit to start the automatic BPDU transmission.

(2) The port control unit automatically transmits specific BPDUs to the opposing bridge device for a specific period at specific intervals.

(3) The CPU 211 instructs the port control unit to stop the automatic BPDU transmission.

Figure 1B:
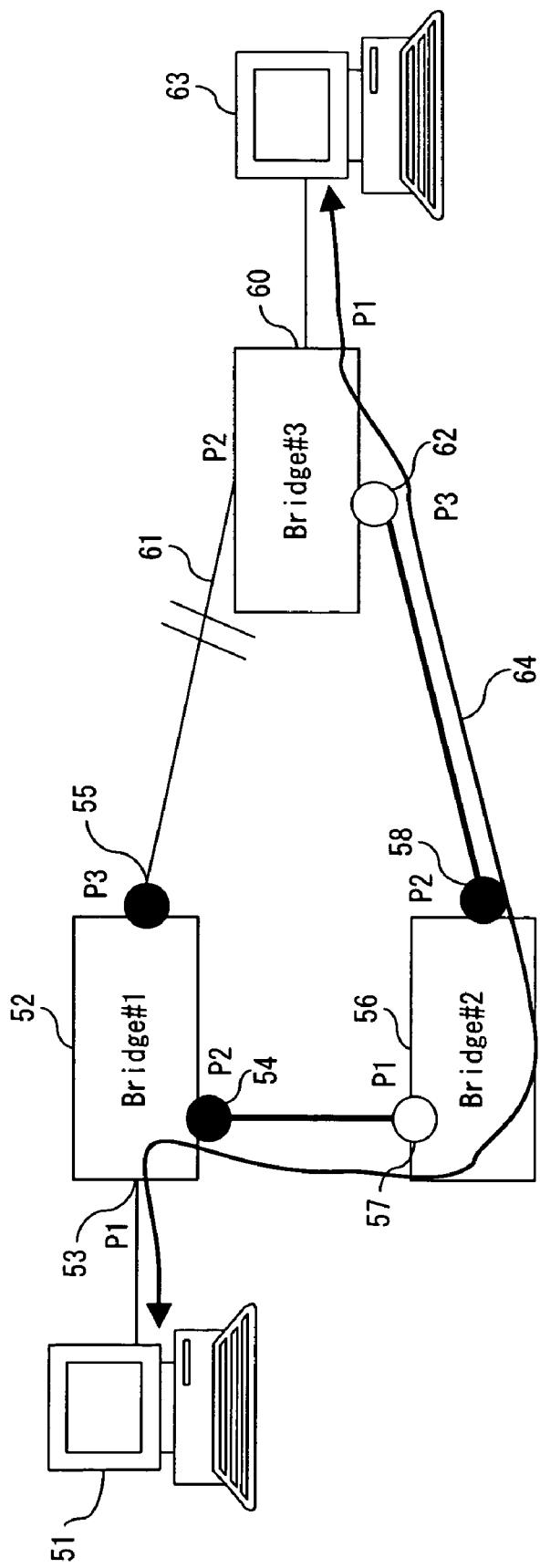
FIG. 1B shows an exemplary configuration of an active topology.
Figure 1C:
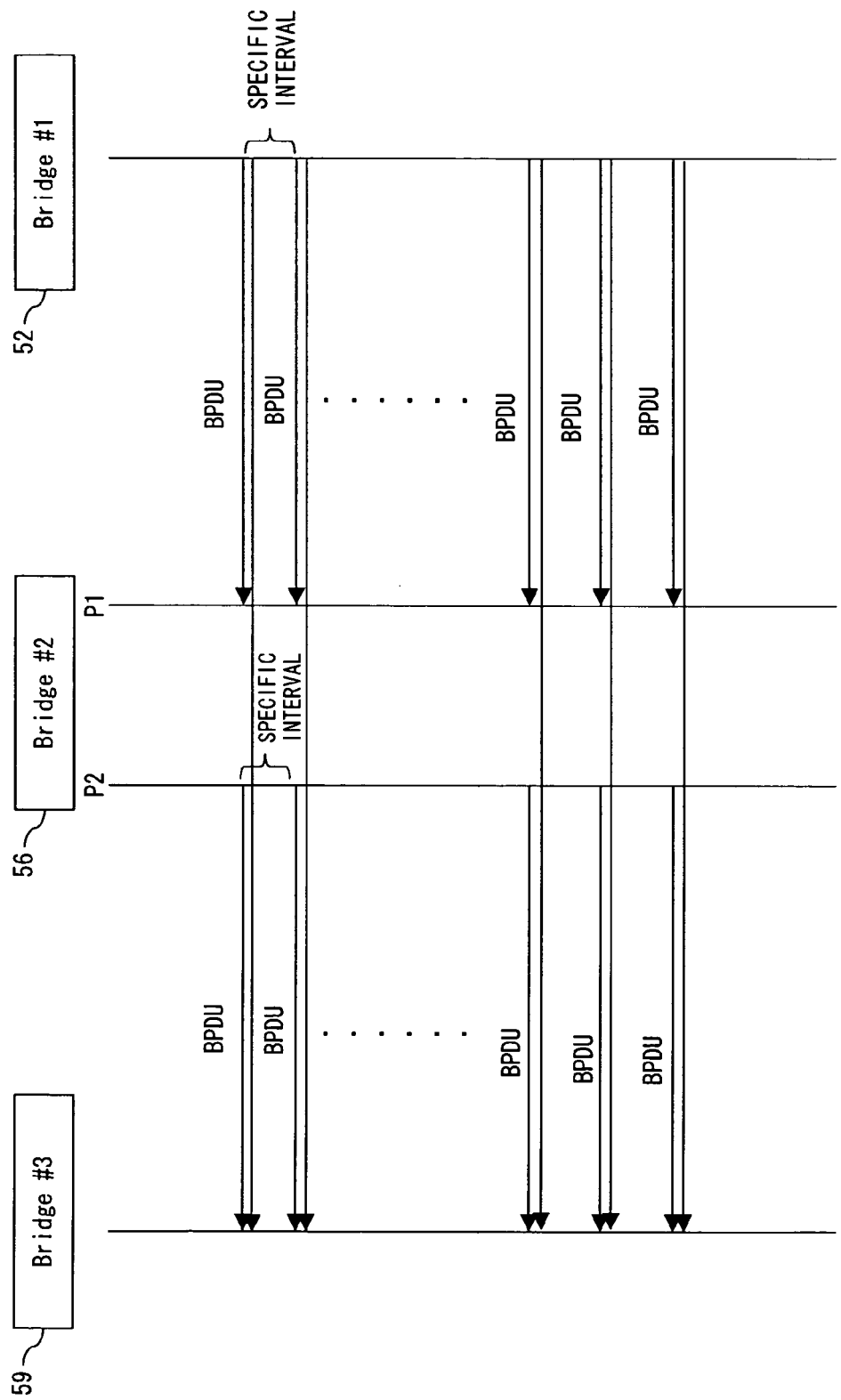
FIG. 1C is a sequence chart showing BPDU transmission/reception in a normal state.

For example, a case where the software of the bridge device 56 shown in FIG. 1B is graded up is described below. As shown in FIG. 1C, normally the bridge device 56 continues to transmit BPDUs to a bridge device 59 at specific intervals, and also a bridge device 52 continues to transmit BPDUs to a bridge device 56 at specific intervals.

Here, when the software upgrade of the bridge device 56 is started, the CPU instructs the port control unit of port 58 to transmit specific BPDUs for a specific period at specific intervals. According to an instruction from the CPU, the port control unit of the port 58 transmits specific BPDUs to the bridge device 59 at specific intervals. Thus, even when the CPU stops, the automatic BPDU transmission by the port control unit is continued.

After the software upgrade is completed and the CPU restarts, the CPU instructs the port control unit of the port 58 to stop the automatic BPDU transmission and also restarts a normal BPDU transmission by the STP protocol processing program.

Thus, the bridge device 56 continuously transmits BPDUs to the bridge device 59 at specific intervals before, during and after the software upgrade of the bridge device. Therefore, the topology re-configuration can be prevented to enable the bridge device 59 to communicate by using another link.

(B) An opposing bridge device connected to a port (for example, root port) other than the designated port of the active ports of a job-target bridge device is made not to detect a change in topology.

In this case, after a software program is loaded down into the bridge device and the initialization of the STP protocol processing program is completed, a BPDU received from its opposing bridge device is transferred to the STP protocol processing program to make BPDU information correctly reflected in the STP protocol processing program. For that purpose, the port control unit correctly transfers a received BPDU to the CPU while automatically transmitting specific BPDUs.

For example, when the CPU restarts during the automatic BPDU transmitting after the software upgrade of the bridge device 56 shown in FIG. 1B is completed, the STP protocol processing program can match a variety of STP parameters, such as dynamically changing port roles, port states and the like, with respective values before the upgrade if the port control unit correctly transfers the received BPDU to the CPU. As a result, the bridge device 56 can transfer the same BPDU to the port which have been transmitting BPDUs before the upgrade, thus preventing the bridge device 59 from starting a topology re-configuration.

After a software program is loaded down into the bridge device and the initialization of the STP protocol processing program is completed, a transitional BPDU transmitted by the STP protocol processing program is discarded, which prevents the opposing bridge device from detecting a change in topology of the opposing on the basis of transitional control information. Specifically, such control is performed as follows:
(1) The CPU inherits information indicating whether it is instructing the automatic BPDU transmission to the port control unit before and after software upgrade.
(2) On the basis of the inheritance information, the CPU discards a BPDU transmit request to the port control unit during the automatic BPDU transmission.
(3) The CPU discards an instruction to flush an MAC table for all port control units, based on the inheritance information during the automatic BPDU transmission.

For example, when the CPU restarts while the bridge device is automatically transmitting a BPDU after the software upgrade of the bridge device 56 shown in FIG. 1B is completed, there is a possibility that the STP protocol processing program may transitionally transfer a BPDU to a port that has not transmitting a BPDU before the upgrade and/or transmits a different BPDU till a variety of STP parameters are matched with the respective values before the upgrade.

In this case, by discarding the BPDU transmit request to all port control units during the automatic BPDU transmission, based on the inheritance information indicating whether it is instructing automatic BPDU transmission, the reception of this BPDU by the opposing bridge device can be prevented. Thus, the start of topology re-configuration of the bridge device 59 can be prevented.

Similarly, by discarding the instruction to flush an MAC table for all port control units during the automatic BPDU transmission, the useless re-learning and flooding of a MAC table can be prevented.

(C) In order to avoid the continuation of loop or communication interruption when the topology of a network changes during software upgrade, a job-target bridge device is made to follow a change in topology and to be automatically restored.

In this case, BPDUs received by the port control unit of a job-target bridge device are monitored, and in the following cases, the transmission/reception of user data is forced to stop. In the following cases, an STP is forced to be initialized.
(a) When by comparing a currently received BPDU with a BPDU received just before, a difference is detected between them
(b) When no BPDU is received even if a specific time elapses after the last BPDU is received
(c) When a port that has never received any BPDU receives a BPDU For example, when the topology of a network changes during the software upgrade of the bridge device 56 shown in FIG. 1B, there is a possibility that the following changes may happen.
　The contents of a BPDU (packet internal data) that the bridge device 56 receives from the bridge device 52 change.
　The bridge device 52 stop transmitting BPDUs to the bridge device 56.
　The bridge device 59 transmits a BPDU to the bridge device 56.

In this case, if the bridge device 56 continues to hold the previous state and continues to transmit the same BPDUs, there is a possibility that loop or communication interruption may continue. Therefore, by monitoring received BPDUs by the port control unit of the bridge device 56 and compulsorily stopping user data transmission/reception in the case of the process (a), (b) or (c), the continuation of a loop can be avoided. By compulsorily initializing an STP, the continuation of a loop can be avoided, and also communication interruption can be released.

If the contents of a received BPDU change, the contents of the change are notified to a port control unit that performs the above-mentioned control (A), and the contents of the BPDU that is automatically transmitted are modified.

The port control unit of the bridge device 56 shown in FIG. 1B compares a BPDU received from the bridge device 52 with a BPDU received just before. If there is a difference between them, the port control unit notifies a port control unit that is currently automatically transmitting BPDUs, of the difference between the currently received BPDU and BPDU received just before. The notified port control unit compares the contents of a BPDU that it autonomously transmits with the notified ones, and modifies the contents of a BPDU that it transmits, if necessary. Thus, loop and communication interruption can be avoided.

By the above-mentioned control (A) through (C), the detection of a change in topology of the opposing bridge device can be prevented until the STP protocol processing program enters a stable state while a software program is being loaded down or after it is loaded down. Therefore, software upgrade can be realized without the duplication of memory, without the installing a redundancy function and without the interruption of a frame transfer service. In order to realize such control, the port control unit of each port has the following functions.
(1) BPDUs specified for each port are automatically transmitted at specific intervals. Specifically, when automatic BPDU transmission by the port control unit is made valid by a command or the like, the following parameters can be set for the port control unit.
　Designation of BPDU transmission: It can be designated whether a BPDU should be transmitted from the relevant port.
　Length of transmitting BPDU: At maximum 64 octets (in the case of the BPDU of an RST, 36 octets+one step of tag+α)
　Transmitting BPDU: The contents of a BPDU to be actually transmitted)
　Transmitting interval: 100 ms-10 second
　Number of transmissions: 1-2,400 (means for automatically stopping BPDU transmission at the time of procedure failure)
The length of a transmitting BPDU can also be used for the designation of BPDU transmission. If no BPDU to be transmitted, the length of a transmitting BPDU is set to 0. If a BPDU to be transmitted, the length of a transmitting BPDU is set to a numeric value other than 0.
(2) Automatic BPDU transmission is forced to stop by a command or a direct instruction from the port control unit.
(3) The following items of a receiving BPDU are monitored for each port.
　Change in contents of a receiving BPDU
　Whether no BPDU is received for a specific period
　Start of BPDU reception
(4) If the contents of the receiving BPDU mentioned in the above process (3) changes, the contents are notified to a port that is automatically transmitting the BPDU.
(5) The contents of the BPDU that is being automatically transmitted is changed using the notice mentioned in the above process (4) as a trigger.

In order to realize the above-mentioned control (A) through (C), the CPU of the main CPU card has the following functions.

(1) A command to instruct automatic BPDU transmission and to discard a BPDU transmit request from the CPU is received, and the following functions (a) and (b) are performed. This command (given for each device) is given in a state where a topology is stable, just before software loading.

(a) Automatic BPDU transmission by the port control unit is activated. In this case, ports that are determined to be capable of automatic transmission are all ports the attribute of whose role is "designated", of the ports operated by an RSTP. The setting conditions of the parameters are as follows:

Designation of BPDU transmission:
   ON: designated port
   OFF: other than designated port
Length of transmitting BPDU:
   36: RSTP (without tag)
   35: STP (without tag)
   37: RSTP (with tag)
   36: STP (with tag)
Transmitting BPDU: The contents of a BPDU to be actually transmitted
Transmitting interval: The current hello-time cycle
Number of transmissions: To be computed so that a continued transmission duration may be constant based on the hello-time cycle The length of a transmitting BPDU can also be used for the designation of BPDU transmission. The length of the transmitting BPDU of a port other than the designated port is set to 0. The length of the transmitting BPDU of the designated port is set to a numeric value other than 0.

(b) The port states of all active ports are fixed by the hardware. Specifically, the following settings are applied for the fixation.

The use of other STP-related commands are prohibited.
An MAC table learned from the relevant port is not flushed.
A BPDU transmit request for the relevant port from the STP protocol processing program is discarded.
A BPDU received by the relevant port is transferred to the STP protocol processing program.

(2) Both the automatic BPDU transmission and the discarding of a BPDU transmit request from the CPU are stopped by a command or the like.

(3) The switching time between the activation/stoppage of both the automatic BPDU transmission and the discarding of a BPDU transmit request from the CPU is set, for example, to less than two seconds (twice the minimum hello-time cycle).

Figure 11:
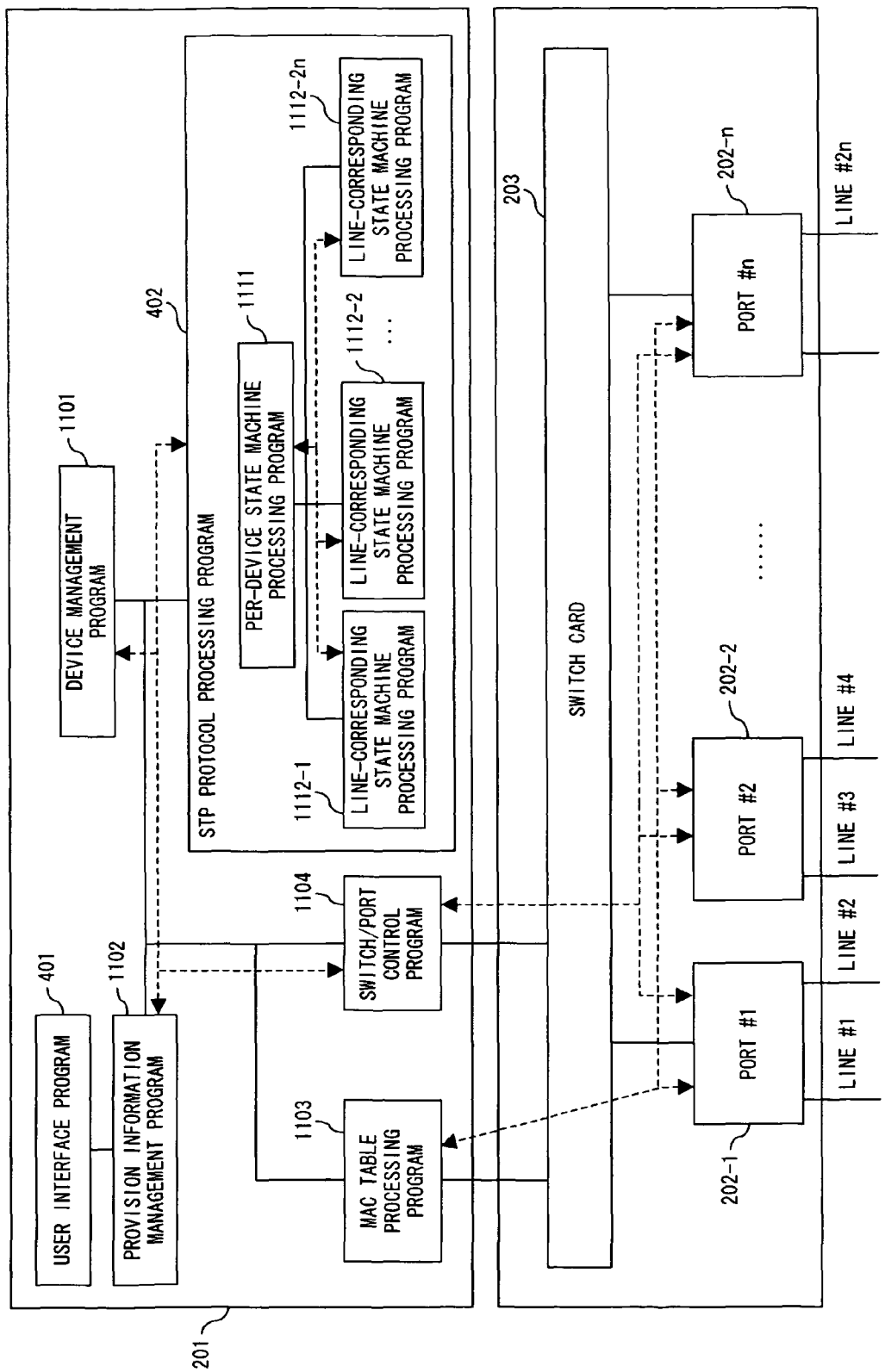
FIG. 11 Shows the software structure of a main CPU card.

FIG. 11 shows a structure of software installed in the main CPU card of such a bridge device. The bridge device shown in FIG. 11 comprises a main CPU card 201, n line cards 202-1~202-n for ports #1~#n and a switch card 203 like the bridge device 200 shown in FIG. 2B. Two lines are connected to each line card 202.

The memory of the main CPU card 201 stores a device management program 1101, a provisioning information managing program 1102, an MAC table processing program 1103 and a switch/port control program 1104, in addition to the user interface program 401 and STP protocol processing program 402. The CPU of the main CPU card 201 performs necessary processes by executing these programs.

Solid lines between these cards and programs indicate interfacing, and the arrows of broken lines between the cards and programs indicate the reference of data. The above-mentioned functions of the port control unit are equipped as functions of the BPDU transmitting and receiving drivers of each line card 202.

The device management program 1101 manages the entire bridge device. Specifically, the program 1101 designates the operating conditions of the switch/port control program 1104 and STP protocol processing program 402, based on the provisioning information of the bridge device in cooperation with the provisioning information managing program 1102. The program 1101 performs necessary processes by obtaining information about the operating state, failure occurrence, failure restoration and the like of the bridge device from both the switch/port control program 1104 and STP protocol processing program 402.

The device management program 1101 manages the activation/stoppage information of both the automatic BPDU transmission and the discarding of a BPDU transmit request from the CPU, and instructs its switch/port control unit to start/stop both the automatic BPDU transmission and the discarding of a BPDU transmit request from the CPU, if necessary, in cooperation with the provisioning information managing program 1102.

The user interface program 401 provides the network management device or simple terminal with an interface, and sets/displays management information in cooperation with the provisioning information managing program 1102. The program 401 issues a trigger for the activation/stoppage of both the automatic BPDU transmission and the discarding of a BPDU transmit request from the CPU, by inputting a command or the like.

The provisioning information managing program 1102 sets/displays provisioning information according to instructions from the user interface program 401, and also transfers the provisioning information to the device management program 1101, switch/port control program 1104, STP protocol processing program 402 and the like. Also, the program 1102 inherits the settings of the activation/stoppage of both the automatic BPDU transmission and the discarding of a BPDU transmit request from the CPU, at the time of CPU restart.

The STP protocol processing program 402, which is the subject of operation of the STP, comprises a per-device state machine processing program 1111 and line-corresponding state machine processing programs 1112-1~1112-2n. The program 402 operates according to operating conditions instructed by the device management program 1101, and if it detects a change in topology, it also notifies the device management program 1101 of the fact.

The MAC table processing program 1103 manages an original MAC table and provides each line card with a necessary MAC table in cooperation with the provisioning information managing program 1102, device management program 1101 and switch/port control program 1104. Simultaneously, the program 1103 instructs the switch card 203 to conduct a necessary switching. The program 1103 stops the flush of an MAC table according to an instruction from the device management program 1101.

The switch/port control program 1104 notifies both the switch card 203 and line card 202 of operating conditions according to instructions from the device management program 1101, and also notifies the device management program 1101 of information about the operating state, failure occurrence, failure restoration and the like of the bridge device from both the switch card 203 and line card 202.

The program 1104 discards a BPDU transmit request from the STP protocol processing program 402 to the line card 202 (from the CPU to the port control unit), and stops the discarding, according to the instructions from the device management program 1101. Simultaneously, the program 1104 instructs the line card 202 to activate/stop the automatic BPDU transmission, according to the instructions from the device management program 1101. Furthermore, the program 1104 compulsorily initializes the STP protocol processing program 402 through the device management program 1101 upon a request from the line card 202.

The switch card 203 switches both necessary functional blocks in each line card 202 and in the bridge device (for example, a program in the main CPU card 201), according to instructions from the switch/port control program 1104.

Each line card 202 transmits/receives a frame referring to the MAC table, according to instructions from the switch/port control program 1104. Each line card 202 automatically transmits BPDUs specified for each port at specific intervals, according to an instruction from the switch/port control program 1104, and compulsorily stops the automatic BPDU transmission, according to an instruction from the switch/port control program 1104.

Each line card monitors received BPDUs according to an instruction from the switch/port control program 1104, and based on the result, it either requests the switch/port control program 1104 to compulsorily initialize the STP or directly notifies a line card 202 that is automatically transmitting the BPDU, of the contents of a change in the BPDU.

The line card 202 that is automatically transmitting a BPDU stops the automatic BPDU transmission or modifies the contents of the BPDU to be automatically transmitted, according to the notification of the BPDU change.

Next, the BPDU transmitting/receiving method of such a bridge device is described with reference to FIG. 12. FIG. 12 is a sequence chart showing the BPDU transmission/reception conducted when the software program of the bridge device 56 is graded up in the active topology shown in FIG. 1B. According to this sequence, for example, a program installed in the main CPU card 201 of the bridge device 56 is graded up.

Firstly, the network management device or simple terminal instructs the bridge device 56 to start an automatic BPDU transmission and to discard a BPDU transmit request from the CPU. During this period, BPDU transfer from the port control unit of port P1 to the CPU is continued.

Thus, even if the CPU of the bridge device 56 stops, BPDUs continues to be transmitted to the bridge device 59. Therefore, the detection of a change in topology of the bridge device 59 can be prevented.

In this case, even if the port control unit of port P1 continues correctly transferring BPDUs received from the bridge device 52 to the STP protocol processing program, the STP protocol processing program can match its internal state to the current topology. Therefore, if the operator completes or stops software upgrade, and the network management device or simple terminal instructs the bridge device 56 to stop the automatic BPDU transmission and to discard the BPDU transmit request from the CPU, the bridge device can be restored without the interruption of the frame transfer service.

After the network management device or simple terminal activates both the automatic BPDU transmission and the discarding of a BPDU transmit request from the CPU, it instructs the bridge device 56 to grade up its software program and to load down the software program. During this period, even if the CPU or STP protocol processing program stops, BPDU transmission is continued. Therefore, the bridge device 59 does not detect a useless change in topology.

Then, when the software upgrade is completed, the CPU re-activates and the STP protocol processing program starts to operate, the topology (internal state) just before the software upgrade can be restored by both the BPDU received from the bridge device 52 and the static parameter of the bridge device 56.

There is a possibility of transitionally transferring a BPDU that does not match with the topology just before the software upgrade, to an arbitrary port in the course of the topology recovery. However, since the discarding of a BPDU transmit request from the CPU is activated, such a BPDU is never transmitted to its opposing bridge device. Therefore, the recovery of the topology just before upgrade can be completed without the detection of a useless change in topology by the opposing bridge device.

Lastly, the network management device or simple terminal instructs the bridge device 56 to stop both the automatic BPDU transmission and the discarding of a BPDU transmit request from the CPU.

According to such a sequence, jobs such as software upgrade and the like can be done without the interruption of a data communication service and without adding a new hardware function to a bridge device. In this case, there is also no need to add any new function to the other bridge devices connected to a job-target bridge device.

If the topology of a network changes and the bridge device 59 becomes a new root bridge during the execution sequence shown in FIG. 12, essentially the port 1 of the bridge device 56 should shift to a blocking state and the port 2 of the bridge device 56 should stop the automatic BPDU transmission.

Therefore, the bridge device 56 monitors the received BPDUs in its ports 1 and 2, stops the automatic BPDU transmission in port 2 and compulsorily initializes the STP using, as a trigger, the fact that port 1 receives no BPDU for a specific period or the fact that port 2 receives a BPDU. By initializing the STP, all ports are temporarily blocked and the transmission of user data is stopped, thus preventing the continuation of a loop. Also, by the normal operation after the STP initialization, communication interruption can be restored.

When the topology of the network changes, the contents of a BPDU transmitted by the bridge device 52 may change. In this case, essentially the contents of a BPDU transmitted by the port 2 of the bridge device 56 must also be changed.

Therefore, the port 1 of the bridge device 56 monitors a receiving BPDU, and when the contents change, it directly notifies port 2 of the change in its contents. Upon receipt of the change in contents, port 2 modifies the contents of a transmitting BPDU according to the notified contents. Thus, the generation of a loop or the occurrence of communication interruption can be prevented.

The present invention can be used when in a device of a network that is operated by the STP, a module (firmware, software, etc.) controlling the device is updated without the interruption of a frame transfer service. In particular, it can be applied when the maintenance of the bridge devices, routers and other devices in the carrier-grade network is conducted.

What is claimed is:

1. A control packet processing apparatus for receiving a control packet including a cost value of a communication route and used to exchange a variety of information among devices that support a spanning tree protocol, comprising:
   a receiving device configured to receive the control packet;
   a buffer device configured to store the received control packet; and
   a control device configured to autonomously transfer the control packet stored in the buffer device to a processing unit in a specific cycle when no control packet is received for a specific period, thereby preventing the processing unit from re-configuring a topology of a spanning tree, wherein the control device starts to transfer the control packet stored in the buffer device to the processing unit when the receiving device receives a control packet instructing transmission stoppage of the control packet.

2. A storage medium on which is recorded a program for enabling the control packet processing apparatus to receive a control packet including a cost value of a communication route and used to exchange a variety of information among bridge devices that support a spanning tree protocol, said program comprising:
 storing the received control packet in a buffer device; and
 autonomously transferring the control packet stored in the buffer device to a processing unit in a specific cycle when no control packet is received for a specific period, thereby preventing the processing unit from re-configuring a topology of a spanning tree,
 wherein said program enables said control packet processing apparatus to start said transferring of the control packet stored in the buffer device to the processing unit when said control packet processing apparatus receives a control packet instructing transmission stoppage of the control packet.

3. The storage medium according to claim 2, wherein said transferring includes generating a pseudo-receiving trigger indicating the reception of a control packet in the specific cycle from when an instruction to stop generating the pseudo-receiving trigger is received until an instruction to stop the generation of the trigger is received, and transferring the control packet stored in said buffer device to the processing unit every time the pseudo-receiving trigger is generated.

4. The storage medium according to claim 2, wherein said transferring includes generating a pseudo-receiving trigger indicating the reception of a control packet in the specific cycle, and transferring the control packet stored in said buffer device to the processing unit every time the pseudo-receiving trigger is generated.

5. The storage medium according to claim 2, wherein said control packet processing apparatus receives a bridge protocol data unit and stores the received bridge protocol data unit as the control packet in said buffer device and the control packet instructing the transmission stoppage is a bridge protocol data unit containing a flag instructing a transmission stoppage.

6. The storage medium according to claim 2, wherein said control packet processing apparatus receives a bridge protocol data unit and stores the received bridge protocol data unit as the control packet in said buffer device and the control packet instructing the transmission stoppage is another control packet other than the bridge protocol data unit.

7. The storage medium according to claim 2, wherein when said control packet processing apparatus receives a control packet instructing transmission restart of the control packet, said program enables said control packet processing apparatus to stop said transferring.

8. The storage medium according to claim 7, wherein said control packet processing apparatus receives a bridge protocol data unit and stores the received bridge protocol data unit as the control packet in said buffer device, the control packet instructing the transmission stoppage is a bridge protocol data unit containing a flag instructing transmission stoppage and the control packet instructing the transmission restart is a bridge protocol data unit containing a flag instructing transmission restart.

9. The storage medium according to claim 7, wherein said control packet processing apparatus receives a bridge protocol data unit and stores the received bridge protocol data unit as the control packet in said buffer device, and each of the control packet instructing the transmission stoppage and the control packet instructing the transmission restart is another control packet other than the bridge protocol data unit.

10. The storage medium according to claim 2, wherein when said control packet processing apparatus receives a subsequent control packet, said program enables said control packet processing apparatus to stop said transferring.

11. A control packet processing method for receiving a control packet including a cost value of a communication route and used to exchange a variety of information among bridge devices that support a spanning tree protocol, comprising:
 receiving the control packet;
 storing the received control packet in a buffer device; and
 autonomously transferring the control packet stored in the buffer device to a processing unit in a specific cycle when no control packet is received for a specific period, thereby preventing the processing unit from re-configuring a topology of a spanning tree,
 wherein the transferring of the control packet stored in the buffer device to the processing unit is started when receiving a control packet instructing transmission stoppage of the control packet.

12. A control packet processing apparatus for receiving a control packet including a cost value of a communication route and used to exchange a variety of information among bridge devices that support a spanning tree protocol, comprising:
 receiving means for receiving the control packet;
 buffer means for storing the received control packet; and
 control means for autonomously transferring the control packet stored in the buffer means to a processing unit in a specific cycle when no control packet is received for a specific period, thereby preventing the processing unit from re-configuring a topology of a spanning tree,
 wherein the control means starts to transfer the control packet stored in the buffer means to the processing unit when the receiving means receives a control packet instructing transmission stoppage of the control packet.

* * * * *